(12) United States Patent
Tzikas et al.

(10) Patent No.: US 6,353,094 B1
(45) Date of Patent: Mar. 5, 2002

(54) DYES, A PROCESS FOR THEIR PREPARATION AND THEIR USE

(75) Inventors: Athanassios Tzikas, Pratteln (CH); Herbert Klier, Efringen-Kirchen (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/525,576

(22) Filed: Mar. 15, 2000

(51) Int. Cl.$^7$ .................... C09B 62/018; C09B 62/038; C09B 62/463
(52) U.S. Cl. ........................................... 534/618; 8/549
(58) Field of Search ................... 534/618; 8/549

(56) References Cited

U.S. PATENT DOCUMENTS

| | | | |
|---|---|---|---|
| 4,758,658 A | 7/1988 | Baxter et al. | 534/652 |
| 5,175,261 A | 12/1992 | Ridyard | 534/631 |
| 5,391,717 A | 2/1995 | Tzikas et al. | 534/635 |
| 5,393,306 A | 2/1995 | Tzikas et al. | 8/543 |
| 5,488,127 A | 1/1996 | Marschner et al. | 558/25 |
| 5,548,071 A | 8/1996 | Deitz et al. | 534/612 |
| 5,596,083 A | 1/1997 | Kunimi et al. | 534/642 |

*Primary Examiner*—Fiona T. Powers
(74) *Attorney, Agent, or Firm*—Kevin T. Mansfield

(57) ABSTRACT

Dyes of the formula

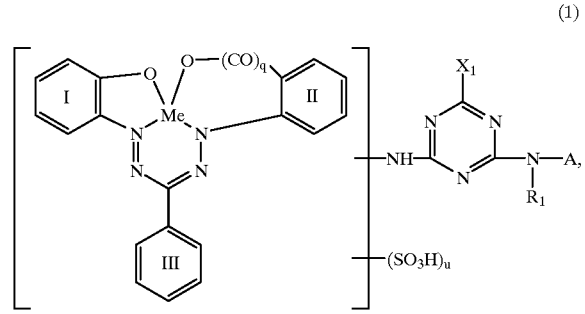

(1)

in which Me, $R_1$, $X_1$, A, u and q are as defined in the specification are particularly suitable for dyeing cotton and produce dyeings with good all-round properties.

14 Claims, No Drawings

DYES, A PROCESS FOR THEIR PREPARATION AND THEIR USE

The present invention relates to novel dyes, in particular reactive dyes, a process for their preparation and their use for dyeing or printing textile fibre materials.

The practice of dyeing using reactive dyes has recently led to increased requirements regarding the quality of the dyeings and the profitability of the dyeing process. There consequently continues to be a need for novel reactive dyes which have improved properties in particular in respect of application.

Reactive dyes which have an adequate substantivity and at the same time a good ease of washing off for the unfixed portions are required nowadays for dyeing. They should furthermore have a good tinctorial yield and a high reactivity, and in particular dyeings with high degrees of fixing should be produced. These requirements are not met in all properties by the known dyes.

The present invention is therefore based on the object of discovering novel improved dyes, in particular reactive dyes, which are used for dyeing and printing fibre materials and have the qualities characterized above to a high degree. The novel dyes should have the distinctive features in particular of high fixing yields and high fibre-dye bond stabilities, and furthermore the portions not fixed to the fibre should be easy to wash out. They should furthermore produce dyeings with good all-round properties, for example light- and wetfastness properties.

It has been found that the object described is substantially achieved with the novel dyes defined below.

The present invention therefore relates to dyes of the formula (1)

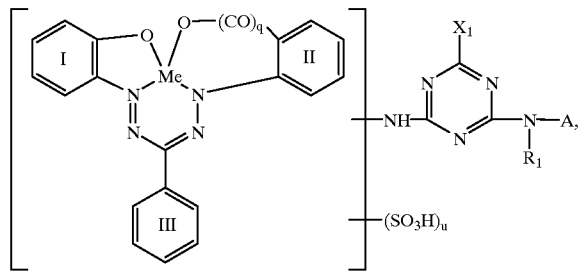

in which

Me is Cu or Ni, $R_1$ is hydrogen or substituted or unsubstituted $C_1$–$C_4$alkyl or $R_1$ is as defined for A, $X_1$ is halogen, hydroxyl, $C_1$–$C_4$alkoxy, substituted or unsubstituted $C_1$–$C_4$alkylthio or amino or is an N-heterocyclic radical which may contain further heteroatoms, u is the number 1, 2, 3 or 4, q is the number 0 or 1, the benzene rings I, II or III are unsubstituted or further substituted and A is a radical of the formula (2a), (2b) or (3)

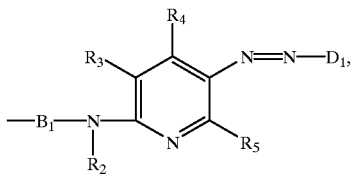

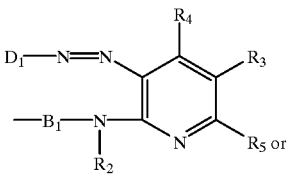

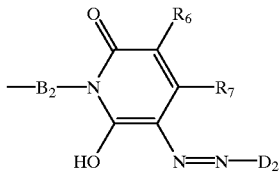

in which $B_1$ and $B_2$ independently of one another are an aliphatic bridge member, $D_1$ and $D_2$ independently of one another are the radical of a diazo component of the benzene or naphthalene series, $R_2$ is hydrogen or substituted or unsubstituted $C_1$–$C_4$alkyl, $R_3$ and $R_6$ independently of one another are hydrogen, cyano, carbamoyl or sulfomethyl, $R_4$ is hydrogen, $C_1$–$C_4$alkyl or amino, $R_5$ is amino or N-mono- or N,N—di—$C_1$–$C_4$alkylamino which are unsubstituted or substituted in the alkyl moiety and $R_7$ is hydrogen or $C_1$–$C_4$alkyl.

The dyes of the formula (1) contain at least two, preferably 2 to 6, and in particular 2 to 4 sulfo groups, each of which is either in the form of its free acid or, preferably, salts thereof. Salts are, for example, the alkali metal, alkaline earth metal or sodium salts, salts of an organic amine or mixtures thereof. Examples are sodium, lithium, potassium or ammonium salts, the salt of mono-, di- or triethanolamine or Na/Li- or Na/Li/$NH_4$ mixed salts.

Me is preferably Cu.

Substituted or unsubstituted $C_1$–$C_4$alkyl $R_1$ and $R_2$ can be methyl, ethyl, n- or i-propyl or n-, sec-, tert- or isobutyl which are unsubstituted or substituted, for example by hydroxyl, sulfo, sulfato, carboxyl, cyano, halogen, $C_1$–$C_4$alkoxycarbonyl or carbamoyl, in particular by hydroxyl, sulfo, sulfato or carboxyl.

$R_1$ is preferably hydrogen, $C_1$–$C_4$alkyl which is unsubstituted or substituted by hydroxyl, or a radical A, particularly preferably hydrogen, methyl, ethyl or β-hydroxyethyl or a radical A, and especially preferably hydrogen or a radical A.

Halogen $X_1$ is, for example, fluorine, chlorine or bromine.

$C_1$–$C_4$alkoxy $X_1$, is, for example, methoxy, ethoxy, n-propoxy, isopropoxy, n-butoxy or isobutoxy, preferably methoxy or ethoxy, and in particular methoxy.

$C_1$–$C_4$alkylthio $X_1$ is, for example, methylthio, ethylthio, n-propylthio, isopropylthio or n-butylthio, in particular ethylthio or n-propylthio. The radicals mentioned are unsubstituted or substituted in the alkyl moiety by hydroxyl, carboxyl or sulfo. The substituted radicals are preferred.

Substituted or unsubstituted amino $X_1$ is amino which is unsubstituted or substituted on the N atom, for example the following radicals:

N-mono- or N,N- di- $C_1$–$C_4$alkylamino, which includes both the unsubstituted radicals and the radicals substituted in the alkyl moiety, for example by $C_1$–$C_4$-alkoxy, hydroxyl, carboxyl, sulfo or sulfato; the radicals substituted in the alkyl moiety are preferred;

$C_5$–$C_7$-cycloalkylamino, which includes both the unsubstituted radicals, and the radicals substituted in the cycloalkyl ring, for example by $C_1$–$C_4$alkyl, in particular methyl; the corresponding cyclohexyl radicals are preferred such radicals;

phenylamino or N—$C_1$–$C_4$-alkyl-N-phenylamino, which includes both the unsubstituted radicals and the radicals substituted in the phenyl ring, for example by $C_1$–$C_4$alkyl, $C_1$–$C_4$alkoxy, halogen, carboxyl or sulfo; these radicals are preferably unsubstituted in the phenyl ring or substituted by sulfo.

N-heterocyclic radicals $X_1$ which may contain further heteroatoms are, for example, morpholino or piperidin-1-yl.

$X_1$ is preferably fluorine or chlorine.

u is preferably the number 1, 2 or 3, in particular 2 or 3.

q is preferably the number 1.

Aliphatic bridge members $B_1$ and $B_2$ are, independently of one another, for example, straight-chain or branched $C_2$–$C_{12}$alkylene which is unsubstituted or substituted by hydroxyl, $C_1$–$C_4$alkoxy, sulfato or sulfo and/or interrupted once or several times by —O— or —NR'—, in which R' is hydrogen or $C_1$–$C_4$alkyl, preferably hydrogen, methyl or ethyl, and particularly preferably hydrogen. $B_1$ and $B_2$ independently of one another are preferably straight-chain or branched $C_2$–$C_6$alkylene, which is unsubstituted or substituted by hydroxyl, sulfo or sulfato, and particularly preferably unsubstituted straight-chain or branched $C_2$–$C_6$-alkylene. Examples of particularly preferred radicals $B_1$ and $B_2$ are 1,2-ethylene, 1,3-propylene, 2-hydroxy-1,3-propylene, 1,4-butylene, 2-methyl-1,5-pentylene and 1,6-hexylene, in particular 1,2-propylene and 1,2-ethylene, and especially 1,2-ethylene.

Substituents which are customary in dyes are suitable for $D_1$ and $D_2$. Examples are the following: $C_1$–$C_4$alkyl, which is to be understood as meaning methyl, ethyl, n- or isopropyl or n-, iso-, sec- or tert-butyl; $C_1$–$C_4$alkoxy, which is to be understood as meaning methoxy, ethoxy, n- or isopropoxy or n-, iso-, sec- or tert-butoxy; hydroxy-$C_1$–$C_4$alkoxy; phenoxy; $C_2$–$C_6$alkanoylamino which is unsubstituted or substituted in the alkyl moiety by hydroxyl or $C_1$–$C_4$alkoxy, for example acetylamino, hydroxyacetylamino, methoxyacetylamino or propionylamino; benzoylamino which is unsubstituted or substituted in the phenyl moiety by hydroxyl, sulfo, halogen, $C_1$–$C_4$alkyl or $C_1$–$C_4$alkoxy; $C_1$–$C_6$alkoxycarbonylamino which is unsubstituted or substituted in the alkyl moiety by hydroxyl, $C_1$–$C_4$alkyl or $C_1$–$C_4$-alkoxy; phenoxycarbonylamino; which is unsubstituted or substituted in the phenyl moiety by hydroxyl, $C_1$–$C_4$alkyl or $C_1$–$C_4$alkoxy; amino; N—$C_1$–$C_4$alkyl- or N,N- di- $C_1$–$C_4$alkylamino which are unsubstituted or substituted in the alkyl moiety by hydroxyl, $C_1$–$C_4$alkoxy, carboxyl, cyano, halogen, sulfo, sulfato, phenyl or sulfophenyl, for example methylamino, ethylamino, N,N-dimethylamino, N,N-diethylamino, β-cyanoethylamino, β-hydroxyethylamino, N,N-di-β-hydroxyethylamino, β-sulfoethylamino, γ-sulfo-n-propylamino, β-sulfatoethylamino, N-(3-sulfobenzyl)amino or N-ethyl-N-(3-sulfobenzyl)amino, N-(β-sulfoethyl)-N-benzylamino; cyclohexylamino; N-phenylamino or N—$C_1$–$C_4$alkyl-N-phenylamino which are unsubstituted or substituted in the phenyl moiety by nitro, $C_1$–$C_4$alkyl, $C_1$–$C_4$alkoxy, carboxyl, halogen or sulfo; $C_1$–$C_4$alkoxycarbonyl, for example methoxy- or ethoxycarbonyl; trifluoromethyl; nitro; cyano; halogen, which is to be understood generally as meaning, for example, fluorine, bromine or, in particular chlorine; ureido, hydroxyl, carboxyl, sulfo; sulfomethyl; carbamoyl; N—$C_1$–$C_4$alkylcarbamoyl, for example N-methylcarbamoyl or N-ethylcarbamoyl; carbamido; sulfamoyl; N—$C_1$–$C_4$alkylsulfamoyl, for example N-methylsulfamoyl or N-ethylsulfamoyl; N-phenylsulfamoyl or N—$C_1$–$C_4$alkyl-N-phenylsulfamoyl; which are unsubstituted or substituted in the phenyl moiety by sulfo or carboxyl; and $C_1$–$C_4$alkylsulfonyl, for example methyl- or ethylsulfonyl;

which, with the exception of sulfo, are also further substituents in the benzene rings II, II or III.

Further substituents in the benzene rings I, II or III are preferably methyl, ethyl, methoxy, ethoxy, acetylamino, benzylamino, amino, chlorine, bromine, ureido, hydroxyl, carboxyl or sulfomethyl, and in particular methyl, ethyl, methoxy, ethoxy, chlorine, bromine, hydroxyl or carboxyl.

Fibre-reactive radicals are also substituents of the radicals $D_1$ and $D_2$.

Fibre-reactive radicals are to be understood as meaning those which are capable of reacting with the hydroxyl groups of cellulose, the amino, carboxyl, hydroxyl and thiol groups in wool and silk, or with the amino and possibly carboxyl groups of synthetic polyamides to form covalent chemical bonds. The fibre-reactive radicals are as a rule bonded to the dye radical directly or by a bridged member. Suitable fibre-reactive radicals are, for example, those which contain at least one substituent which can be split off on an aliphatic, aromatic or heterocyclic radical, or in which the radicals mentioned contain a radical which is suitable for reaction with the fibre material, for example a vinyl radical.

Preferred fibre-reactive radicals for $D_1$ and $D_2$ are the radicals of the formula (4a), (4b), (4c), (4d), (4e), (4f) or (4g)

—$SO_2$—Y      (4a),

—NH—CO—$(CH_2)_r$—$SO_2$—Y      (4b),

—$CONR_8$—$(CH_2)_m$—$SO_2$—Y      (4c),

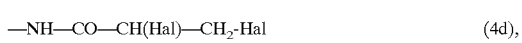
—NH—CO—CH(Hal)—$CH_2$-Hal      (4d),

—NH—CO—C(Hal)=$CH_2$      (4e), (4f)

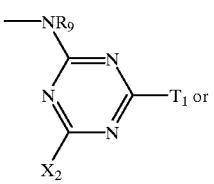

-continued

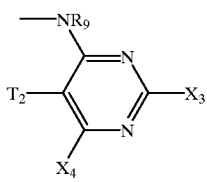

(4g)

in which

Hal is chlorine or bromine;

$X_2$ is halogen, 3-carboxypyridin-1-yl or 3-carbamoylpyridin-1-yl;

$T_1$ independently is as defined for $X_2$ or is a substituent which is not fibre-reactive or a fibre-reactive radical of the formula (5a), (5b), (5c), (5d), (5e) or (5f)

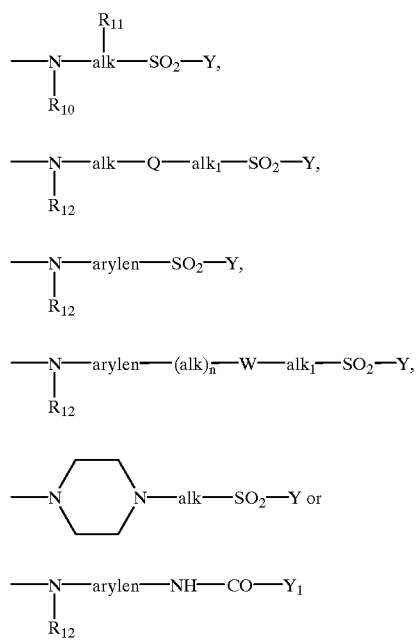

in which $R_8$ and $R_{10}$ independently of one another are each hydrogen, $C_1$–$C_4$alkyl which is unsubstituted or substituted by hydroxyl, sulfo, sulfato, carboxyl or cyano or a radical

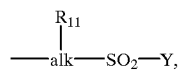

$R_9$ and $R_{12}$ independently of one another are each hydrogen or $C_1$–$C_4$alkyl, $R_{11}$, is hydrogen, hydroxyl, sulfo, sulfato, carboxyl, cyano, halogen, $C_1$–$C_4$alkoxycarbonyl, $C_1$–$C_4$alkanoyloxy, carbamoyl or the group —$SO_2$—Y, alk and $alk_1$ independently of one another are linear or branched $C_1$–$C_6$alkylene, arylen is a phenylene or naphthylene radical which are unsubstituted or substituted by sulfo, carboxyl, $C_1$–$C_4$alkyl, $C_1$–$C_4$alkoxy or halogen, Q is a radical —O— or —$NR_{12}$—, in which $R_{12}$ is as defined above, W is a group —$SO_2$—$NR_8$—, —$CONR_8$— or —$NR_8CO$—, in which $R_8$ is as defined above, Y is vinyl or a radical —$CH_2$—$CH_2$—U and U is a group which can be split off under alkaline conditions, $Y_1$ is a group —CH(Hal)- $CH_2$- Hal or —C(Hal)=$CH_2$ and Hal is chlorine or bromine and l and m independently of one another are an integer from 1 to 6 and n is the number 0 or 1; and $X_3$ is halogen or $C_1$–$C_4$alkylsulfonyl;

$X_4$ is halogen or $C_1$–$C_4$alkyl and $T_2$ is hydrogen, cyano or halogen.

A group U which can be split off under alkaline conditions is, for example, —Cl, —Br, —F, —$OSO_3H$, —$SSO_3H$, —OCO—$CH_3$, —$OPO_3H_2$, —OCO—$C_6H_5$, —$OSO_2$—$C_1$–$C_4$alkyl or —$C_4$alkyl)$_2$. U is preferably a group of the formula —Cl, —$OSO_3H$, —$SSO_3H$, —OCO—$CH_3$, —OCO—$C_6H_5$ or —$OPO_3H_2$, in particular —Cl or —$OSO_3H$, and particularly preferably —$OSO_3H$.

Examples of suitable radicals Y are accordingly vinyl, β-bromo- or β-chloroethyl, β-acetoxyethyl, β-benzoyloxyethyl, β-phosphatoethyl, β-sulfatoethyl and β-thiosulfatoethyl. Y is preferably vinyl, β-chloroethyl or β-sulfatoethyl, and in particular vinyl or β-sulfatoethyl.

$R_8$ and $R_{10}$ independently of one another are preferably hydrogen or $C_1$–$C_4$alkyl, such as methyl, ethyl, propyl, isopropyl, butyl, isobutyl, sec-butyl or tert-butyl and particularly preferably hydrogen, methyl or ethyl. $R_8$ and $R_{10}$ are particularly preferably hydrogen.

$R_9$ and $R_{12}$ independently of one another are each preferably hydrogen, methyl or ethyl, and particularly preferably hydrogen.

$R_{11}$ is preferably hydrogen.

l and m independently of one another are preferably the number 2, 3 or 4, and particularly preferably the number 2 or 3.

Especially preferably, l is the number 3 and m is the number 2.

A non-reactive substituent $T_1$ can be, for example, hydroxyl; $C_1$–$C_4$alkoxy; $C_1$–$C_4$alkylthio which is unsubstituted or substituted by hydroxyl, carboxyl or sulfo; amino; amino which is mono- or disubstituted by $C_1$–$C_8$alkyl, in which the alkyl is unsubstituted or further substituted, for example, by sulfo, sulfato, hydroxyl, carboxyl or phenyl, in particular by sulfo or hydroxyl, and may be interrupted by a radical —O—; cyclohexylamino; morpholino; N—$C_1$–$C_4$alkyl-N-phenylamino or phenylamino or naphthylamino, in which the phenyl or naphthyl are unsubstituted or substituted, for example by $C_1$–$C_4$-alkyl, $C_1$–$C_4$-alkoxy, carboxyl, sulfo or halogen.

Examples of suitable non-reactive substituents $T_1$ are amino, methylamino, ethylamino, β-hydroxyethylamino, N,N-di-β-hydroxyethylamino, β-sulfoethylamino, cyclohexylamino, morpholino, 2-, 3- or 4-chlorophenylamino, 2-, 3- or 4-methylphenylamino, 2-, 3- or 4-methoxyphenylamino, 2-, 3- or 4-sulfophenylamino, disulfophenylamino, 2-, 3- or 4-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or iso-propoxy and hydroxyl.

A radical $T_1$ which is not fibre-reactive is preferably $C_1$–$C_4$alkoxy, $C_1$–$C_4$-alkylthio which is unsubstituted or substituted by hydroxyl, carboxyl or sulfo, hydroxyl, amino, N-mono- or N,N-di-$C_1$–$C_4$alkylamino which are unsubstituted or substituted in the alkyl moiety by hydroxyl, sulfato or sulfo, morpholino, phenylamino or N—$C_1$–$C_4$alkyl-N-phenylamino, which are unsubstituted or substituted in the phenyl ring by sulfo, carboxyl, acetylamino, chlorine, methyl or methoxy and in which the alkyl is unsubstituted or substituted by hydroxyl, sulfo or sulfato, or naphthylamino which is unsubstituted or substituted by 1 to 3 sulfo groups.

Particularly preferred radicals $T_1$ which are not fibre-reactive are amino, N-methylamino, N-ethylamino, N-β-hydroxyethylamino, N-methyl-N-β-hydroxyethylamino, N-ethyl-N-β-hydroxyethylamino, N,N-di-β-hydroxyethylamino, morpholino, 2-, 3- or 4-carboxyphenylamino, 2-, 3- or 4-sulfophenylamino or N—$C_1$–$C_4$-alkyl-N-phenylamino.

Halogen $X_2$ is, for example, fluorine, chlorine or bromine, and in particular chlorine or fluorine.

$X_2$ is preferably chlorine or fluorine.

Halogen $T_2$, $X_3$ and $X_4$ are, for example, fluorine, chlorine or bromine, in particular chlorine or fluorine.

$C_1$–$C_4$alkylsulfonyl $X_3$ is, for example, ethylsulfonyl or methylsulfonyl, and in particular methylsulfonyl.

$C_1$–$C_4$alkyl $X_4$ is, for example, methyl, ethyl, n- or iso-propyl or n-, iso- or tert-butyl, and in particular methyl.

$X_3$ and $X_4$ are preferably independently of one another chlorine or fluorine.

$T_2$ is preferably cyano or chlorine.

Hal is preferably bromine.

Alk and $alk_1$ independently of one another are, for example, a methylene, ethylene, 1,3-propylene, 1,4-butylene, 1,5-pentylene or 1,6-hexylene radical or branched isomers thereof.

Alk and $alk_1$ independently of one another are preferably each a $C_1$–$C_4$alkylene radical, and particularly preferably an ethylene or propylene radical.

Arylen is preferably a 1,3- or 1,4-phenylene radical which is unsubstituted or substituted, for example by sulfo, methyl, methoxy or carboxyl, and particularly preferably an unsubstituted 1,3- or 1,4-phenylene radical.

Q is preferably —NH— or —O—, and particularly preferably —O—.

W is preferably a group of the formula —CONH— or —NHCO—, in particular a group of the formula —CONH—.

n is preferably the number 0.

The reactive radicals of the formulae (5a) to (5f) are preferably those in which W is a group of the formula —CONH—, $R_{10}$, $R_{11}$ and $R_{12}$ are each hydrogen, Q is the radical —O— or —NH—, alk and $alk_1$ independently of one another are each ethylene or propylene, arylen is phenylene which is unsubstituted or substituted by methyl, methoxy, carboxyl or sulfo, Y is vinyl or β-sulfatoethyl, $Y_1$ is —CHBr—$CH_2$Br or —CBr=$CH_2$ and n is the number 0.

Fibre-reactive radicals for $D_1$ and $D_2$ are particularly preferably radicals of the formula (4a), (4b), (4c), (4d), (4e) or (4f), in which Y is vinyl, β-chloroethyl or β-sulfatoethyl, Hal is bromine, $R_8$ and $R_9$ are hydrogen, 1 and m are the number 2 or 3, $X_2$ is halogen, $T_1$ is $C_1$–$C_4$alkoxy, $C_1$–$C_4$alkylthio which is unsubstituted or substituted by hydroxyl, carboxyl or sulfo, hydroxyl, amino, N-mono- or N,N- di- $C_1$–$C_4$-alkylamino which are unsubstituted or substituted in the alkyl moiety by hydroxyl, sulfato or sulfo, morpholino, phenylamino or N—$C_1$–$C_4$alkyl-N-phenylamino which are unsubstituted or substituted in the phenyl ring by sulfo, carboxyl, chlorine, acetylamino, methyl or methoxy and in which the alkyl is unsubstituted or substituted by hydroxyl, sulfo or sulfato, naphthylamino which is unsubstituted or substituted by 1 to 3 sulfo groups, or a fibre-reactive radical of the formula (5a'), (5b'), (5c'), (5d') or (5f')

—NH—$(CH_2)_{2-3}$—$SO_2Y$ (5a'),

—NH—$(CH_2)_{2-3}$—O—$(CH_2)_{2-3}$—$SO_2Y$ (5b'),

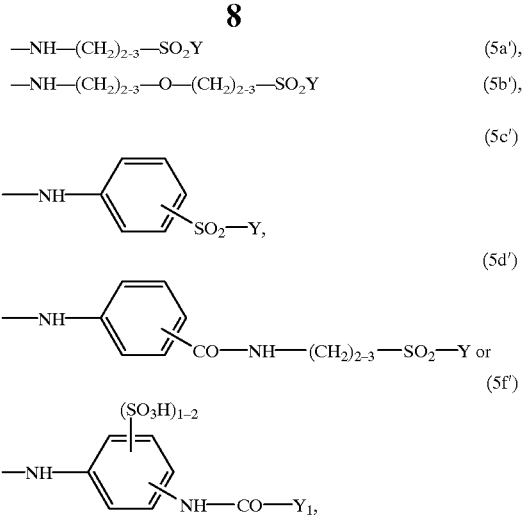

in particular a fibre-reactive radical of the formula (5c') or (5d'), in which

Y is vinyl, β-chloroethyl or β-sulfatoethyl and $Y_1$ is a group —CH(Br)—$CH_2$—Br or —C(Br)=$CH_2$.

In the case of the radicals of the formula (5a') and (5b'), Y is preferably β-chloroethyl. In the case of the radicals of the formulae (5c') and (5d'), Y is preferably vinyl or β-sulfatoethyl.

$D_1$ and $D_2$ preferably contain at least one fibre-reactive radical.

$D_1$ and $D_2$ are preferably a phenyl or naphthyl radical which are unsubstituted or further substituted by substituents customary in dyes, for example $C_1$–$C_4$alkyl, $C_1$–$C_4$alkoxy, halogen, sulfo, nitro, carboxyl or a fibre-reactive radical of the formula (4a), (4b), (4c), (4d), (4e), (4f) or (4g), where the fibre-reactive radicals mentioned are as defined and preferred above.

A radical $D_1$ or $D_2$ of a substituted or unsubstituted diazo component of the benzene or naphthaline series also includes monoazo radicals, for example those of the formula (6) or (7)

or

preferably of the formula (7), in which D* is the radical of a diazo component of the benzene or naphthaline series, K* is the radical of a coupling component of the benzene, naphthaline, pyrazolone, 6-hydroxypyrid-2-one or acetoacetic acid arylamide series and K** is the radical of the coupling component of the benzene or naphthaline series, where D*, K* and K** can carry substituents customary in dyes.

Substituents for D*, K* and K** which are not fibre-reactive are preferably $C_1$–$C_4$alkyl or $C_1$–$C_4$alkoxy which are unsubstituted or further substituted by hydroxyl, $C_1$–$C_4$alkoxy, sulfo or sulfato, halogen, carboxyl, sulfo, nitro, cyano, trifluoromethyl, sulfamoyl, carbamoyl, amino, ureido, hydroxyl, sulfomethyl, $C_2$–$C_4$alkanoylamino, $C_1$–$C_4$alkylsulfonylamino, benzoylamino which is unsubstituted or substituted in the phenyl ring by $C_1$–$C_4$alkyl, $C_1$–$C_4$alkoxy, halogen or sulfo or phenyl which is unsubstituted or substituted by $C_1$–$C_4$alkyl, $C_1$–$C_4$alkoxy, halogen, carboxyl or sulfo.

Fibre-reactive substituents for D*, K* and K** are preferably the radicals of the formula (4a), (4c), (4d), (4e) or (4f), in particular (4a), where the radicals mentioned are as defined and preferred above.

The monoazo radicals of the formula (6) or (7) preferably contain at least one sulfo group.

Preferred monoazo radicals $D_1$ and $D_2$ of the formula (7) are the radicals of the formula (7a), (7b), (7c), (7d), (7e), (7f), (7g), (7h), (7i) or (7j)

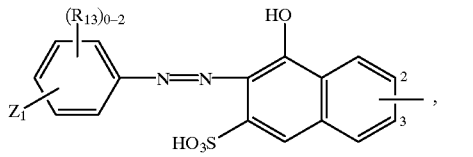
(7a)

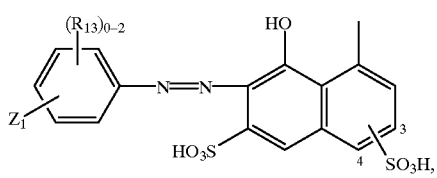
(7b)

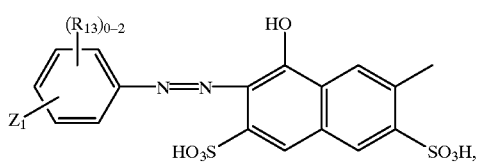
(7c)

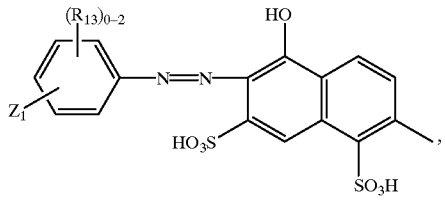
(7d)

in which $(R_{13})_{0-2}$ is 0 to 2 identical or different substituents from the group consisting of $C_1$–$C_4$alkyl, $C_1$–$C_4$alkoxy, halogen, carboxyl and sulfo and $Z_1$, is a fibre-reactive radical of the formula (4a), (4c), (4d), (4e) or (4f), where the fibre-reactive radicals mentioned are as defined and preferred above,

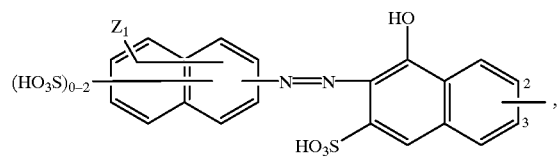
(7e)

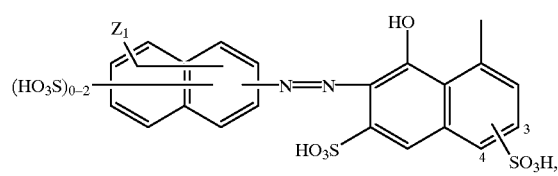
(7f)

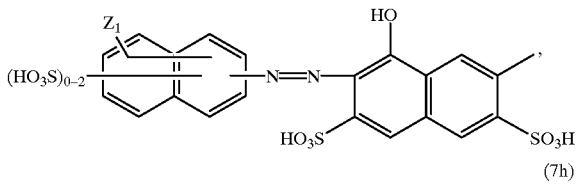
(7g)

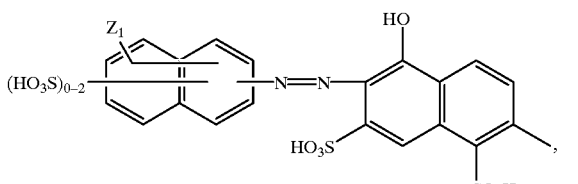
(7h)

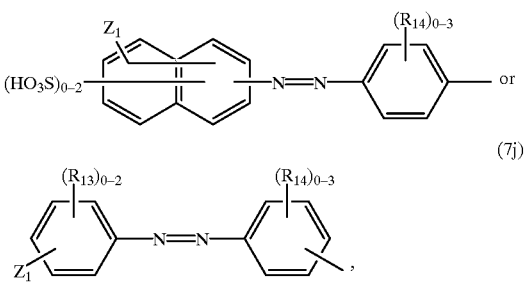
(7i) or (7j)

in which $(R_{13})_{0-2}$ is as defined above, $(R_{14})_{0-3}$ is 0 to 3 identical or different substituents from the group consisting of halogen, nitro, cyano, trifluoromethyl, sulfamoyl, carbamoyl, $C_1$–$C_4$alkyl, $C_1$–$C_4$alkoxy which is unsubstituted or substituted by hydroxyl, sulfato or $C_1$–$C_4$alkoxy, amino, $C_2$–$C_4$alkanoylamino, ureido, hydroxyl, carboxyl, sulfomethyl, $C_1$–$C_4$alkylsulfonylamino, sulfo and a fibre-reactive radical of the formula (4f')

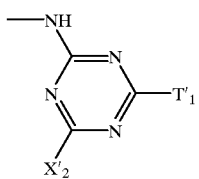
(4f')

in which $X'_2$ is fluorine or chlorine and $T'_1$ is amino, N-mono- or N,N- di- $C_1$–$C_4$alkylamino which is unsubstituted or substituted in the alkyl moiety by hydroxyl, sulfato or sulfo, morpholino, phenylamino or N—$C_1$–$C_4$alkyl-N-phenylamino which are unsubstituted or substituted in the phenyl ring by sulfo, carboxyl, acetylamino, chlorine, methyl or methoxy and in which the alkyl is unsubstituted or substituted by hydroxyl, sulfo or sulfato or naphthylamino which is unsubstituted or substituted by 1 to 3 sulfo groups and $Z_1$ is as defined above.

The numbers on the naphthyl rings of the radicals of the formulae (7a), (7b), (7e) and (7f) identify the possible bonding positions.

The radicals $D_1$ and $D_2$ independently of one another are preferably each a radical of the formula (8) or (9)

(8)

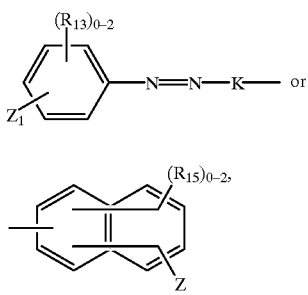

or (9)

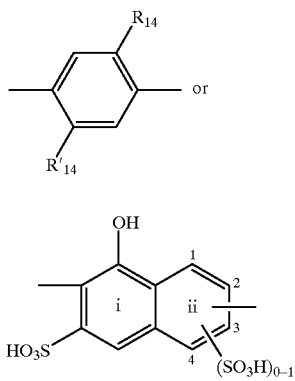

in particular of the formula (9), in which
  $(R_{13})_{0-2}$ and $(R_{15})_{0-2}$ independently of one another are 0 to 2 identical or different substituents chosen from the group consisting of halogen, $C_1$–$C_4$alkyl, $C_1$–$C_4$alkoxy, carboxyl and sulfo;
  K is the radical of a coupling component of the formula (10a) or (10b)

(10a)

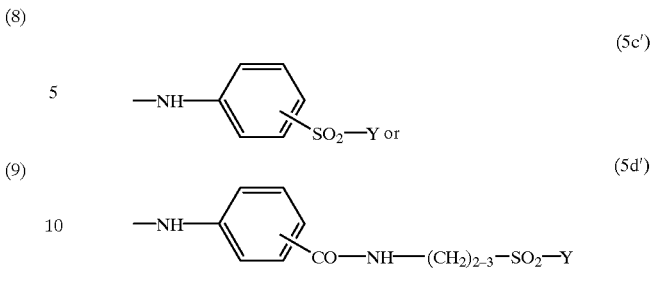

(10b)

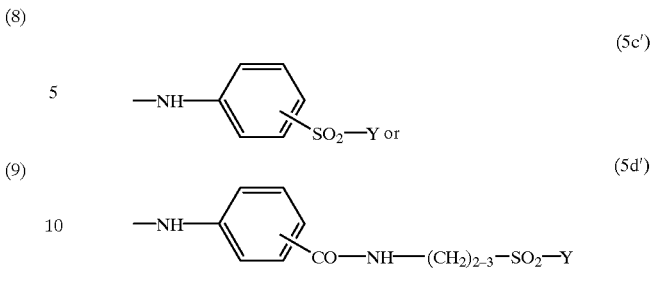

in which
  $R_{14}$ is hydrogen, sulfo or $C_1$–$C_4$alkoxy which is unsubstituted or substituted in the alkyl moiety by hydroxyl or sulfato and
  $R'_{14}$ is hydrogen, $C_1$–$C_4$alkyl, $C_1$–$C_4$alkoxy, $C_2$–$C_4$alkanoylamino, ureido or a radical of the formula (4f'), in which $X'_2$ and $T'_1$ are as defined above; and
  Z and $Z_1$ independently of one another are a radical of the formula (4a), (4b), (4c), (4d), (4e) or (4f), in which
  $R_8$ and $R_9$ are hydrogen,
  Hal is bromine,
  Y is vinyl, β-chloroethyl or β-sulfatoethyl,
  l and m independently of one another are the number 2 or 3,
  $X_2$ is chlorine or fluorine and
  $T_1$ is $C_1$–$C_4$alkoxy, $C_1$–$C_4$alkylthio which is unsubstituted or substituted by hydroxyl, carboxyl or sulfo, hydroxyl, amino, N-mono- or N,N- di- $C_1$–$C_4$alkylamino, which are unsubstituted or substituted in the alkyl moiety by hydroxyl, sulfato or sulfo, morpholino, phenylamino or N—$C_1$–$C_4$alkyl- N-phenylamino which are unsubstituted or substituted in the phenyl ring by sulfo, carboxyl, acetylamino, chlorine, methyl or methoxy and in which the alkyl is unsubstituted or substituted by hydroxyl, sulfo or sulfato, naphthylamino which is unsubstituted or substituted by 1 to 3 sulfo groups, or a fibre-reactive radical of the formula (5c') or (5d')

(5c')

—NH—⌬—SO$_2$—Y or (5d')

—NH—⌬—CO—NH—(CH$_2$)$_{2-3}$—SO$_2$—Y in which

Y is as defined above, and in particular is vinyl or β-sulfatoethyl.
  $C_1$–$C_4$alkyl $R_{13}$, $R'_{14}$ and $R_{15}$ independently of one another are, for example, methyl, ethyl, n-propyl, isopropyl, n-butyl, sec-butyl, tert-butyl or isobutyl, preferably methyl or ethyl, and in particular methyl.
  $C_1$–$C_4$alkoxy $R_{13}$, $R_{14}$, $R'_{14}$ and $R_{15}$ independently of one another are, for example, methoxy, ethoxy, n-propoxy, isopropoxy, n-butoxy or isobutoxy, preferably methoxy or ethoxy, and in particular methoxy. $R_{14}$ is unsubstituted or may be substituted in the alkyl moiety by hydroxyl or sulfato.
  Halogen $R_{13}$ and $R_{15}$, independently of one another are, for example, fluorine, chlorine or bromine, preferably chlorine or bromine, and in particular chlorine.
  $C_2$–$C_4$alkanoylamino $R'_{14}$ is, for example, acetylamino or propionylamino, in particular acetylamino.
  In the radical of the coupling component of the formula (10b), the sulfo group in ring ii is preferably bonded in the 3 or 4-position. If the ring ii contains a sulfo group, the radical of the formula (10b) is preferably bonded to ring ii in the 1, 2 or 3-position. If no sulfo is present in the ring ii, the radical of the formula (10b) is preferably bonded in the 1-, 2 or 3-position on ring ii.
  The radicals $D_1$ and $D_2$ independently of one another are particularly preferably each a radical of the formula (9a), (9b), (9c), (9d), (9e) or (9f)

(9a)

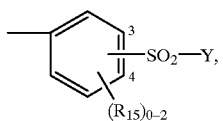

(9b)

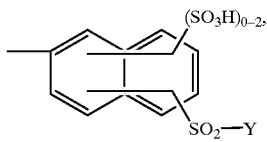

(9c)

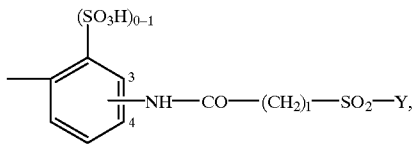

-continued

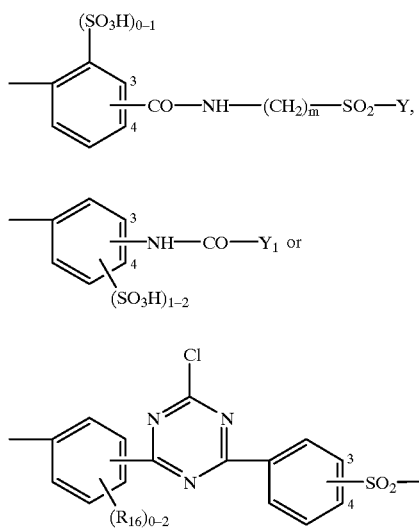

in which $(R_{15})_{0-2}$ and $(R_{16})_{0-2}$ independently of one another are 0 to 2 identical or different substituents chosen from the group consisting of halogen, $C_1$–$C_4$alkyl, $C_1$–$C_4$alkoxy and sulfo, in particular methyl, methoxy and sulfo, Y is vinyl, β-chloroethyl or β-sulfatoethyl, $Y_1$ is a group —CH(Br)—CH$_2$—Br or —C(Br)=CH$_2$, l is the number 2 or 3, in particular 3, and m is the number 2 or 3, in particular 2.

The numbers in the radicals of the formulae (9a), (9c), (9d), (9e) and (9f) identify the possible bonding positions of the fibre-reactive radical.

In the case of the radicals of the formulae (9a), (9b), (9d) and (9f), Y is preferably vinyl or β-sulfatoethyl.

In the case of the radical of the formula (9c), Y is preferably β-chloroethyl.

$D_1$ and $D_2$ independently of one another are preferably in each case a radical of the formula (9a) or (9b), and in particular (9a).

$R_2$ is preferably hydrogen or $C_1$–$C_4$alkyl, particularly preferably hydrogen, methyl or ethyl, and especially preferably hydrogen.

$R_3$ is preferably cyano or carbamoyl, and in particular cyano.

$C_1$–$C_4$alkyl $R_4$ and $R_7$ independently of one another are, for example, methyl, ethyl, n- or iso-propyl or n-, sec-, tert- or iso-butyl, preferably methyl or ethyl, and in particular methyl.

$R_4$ is preferably methyl, ethyl or amino, and in particular methyl.

N-Mono- or N,N—di—$C_1$–$C_4$alkylamino $R_5$ is unsubstituted or substituted in the alkyl moiety, for example by $C_1$–$C_4$alkyl, $C_1$–$C_4$alkoxy, $C_2$–$C_4$alkanoylamino, hydroxyl, sulfo, sulfato or carboxyl, preferably hydroxyl, sulfo or sulfato, and in particular hydroxyl. Examples are the following radicals: N-methylamino, N,N-dimethylamino, N-ethylamino, N-β-hydroxyethylamino, N,N-di-β-hydroxyethylamino, N-β-sulfatoethylamino, N-β-sulfoethylamino or N-β-carboxyethylamino.

$R_5$ is preferably amino or N-mono-$C_1$–$C_4$alkylamino which is unsubstituted or substituted in the alkyl moiety by hydroxyl, sulfo or sulfato, and in particular amino or N-β-hydroxyethylamino.

$R_6$ is preferably carbamoyl or sulfomethyl, in particular carbamoyl.

$R_7$ is preferably methyl or ethyl, and in particular methyl.

The formazan radical in the dye of the formula (1) is preferably a radical of the formula (11) or (12)

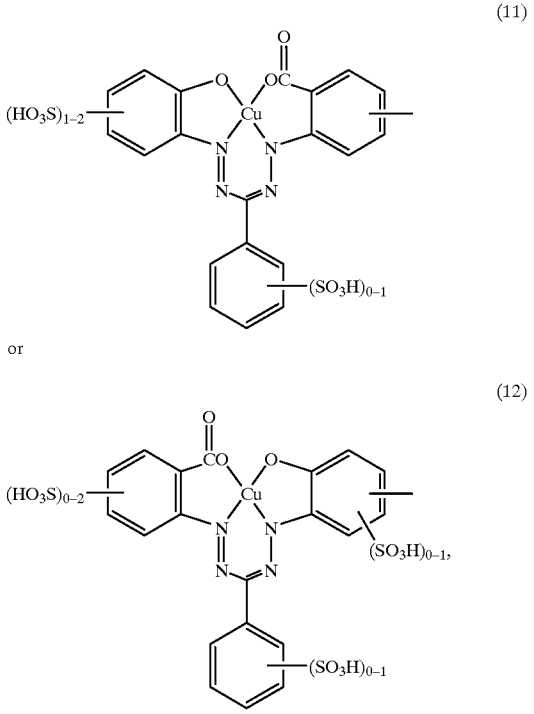

preferably a radical of the formula (12).

The formazan radicals in the dyes of the formula (1) according to the invention are particularly preferably the radicals of the formula (12a) or (12b)

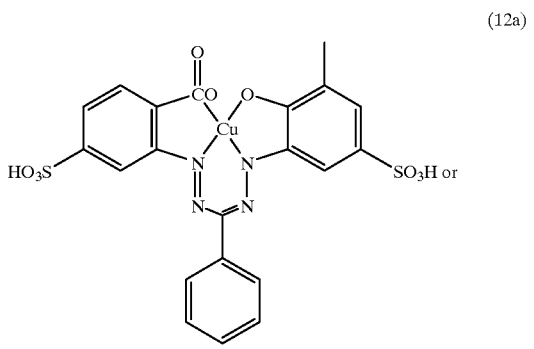

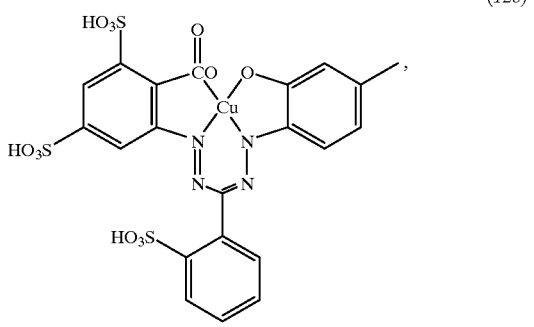

in particular (12a).

The dyes of the formula (1) according to the invention preferably have the formula (1a)

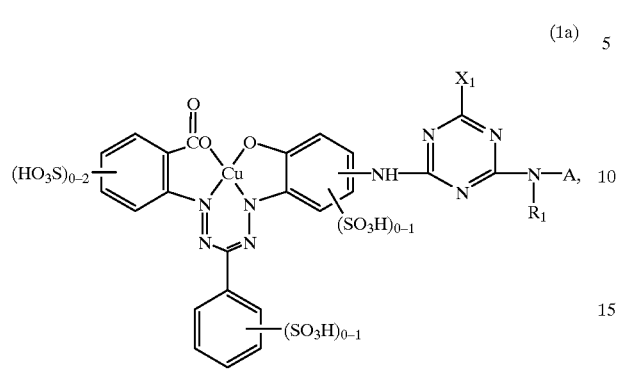
(1a)

in which $X_1$ is fluorine or chlorine, $R_1$ is hydrogen or $R_1$ is as defined for A and A is a radical of the formula (2a'), (2b') or (3a)

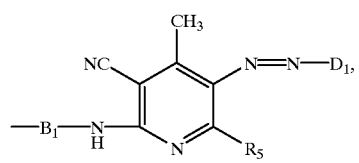
(2a')

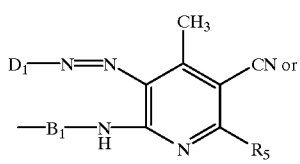
(2b')

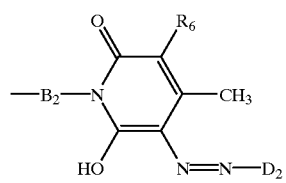
(3a)

in which $B_1$ and $B_2$ are straight-chain or branched $C_2$–$C_6$alkylene, $D_1$ and $D_2$ independently of one another are each a radical of the formula (9a), (9b), (9c), (9d), (9e) or (9f), where the radicals mentioned are as defined and preferred above, $R_5$ is amino or N-β-hydroxyethylamino and $R_6$ is carbamoyl or sulfomethyl, in particular carbamoyl.

The dyes of the formula (1), according to the invention particularly preferably have the formula (1a')

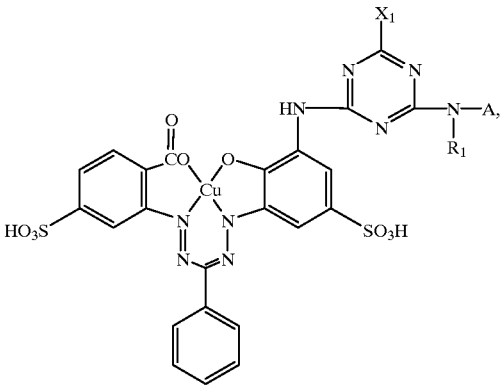
(1a')

in which $X_1$, $R_1$, and A are as defined and preferred above under formula (1a).

The present invention furthermore relates to a process for the preparation of the dyes according to the invention, which comprises reacting in each case about 1 molar equivalent of a compound of the formula (13)

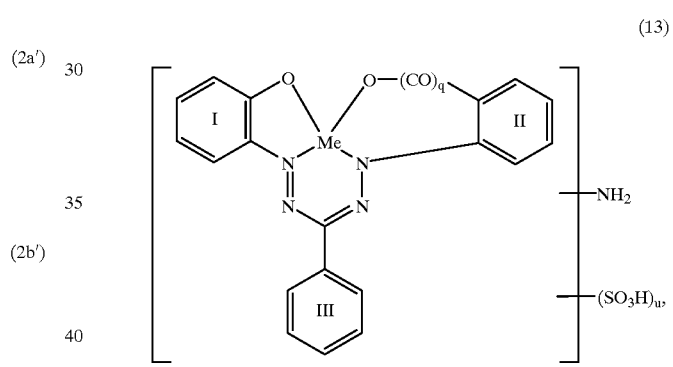
(13)

a compound of the formula (14)

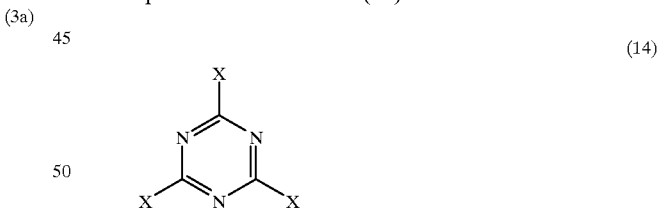
(14)

and an amine of the formula (15)

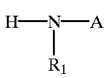
(15)

with one another in any sequence, where A, Me, $R_1$, u and q are as defined and preferred above and X is halogen, in particular fluorine or chlorine.

The individual process steps defined above can be carried out in various sequences, and where appropriate in some cases also simultaneously, so that various process variants are possible. In general, the reaction is carried out stepwise in succession, the sequence of the simple reactions between the individual reaction components advantageously depending on the particular conditions.

One process variant comprises subjecting a compound of the formula (13) to a condensation reaction with cyanuric chloride or cyanuric fluoride and reacting the resulting product with a compound of the formula (15).

The condensation reactions between the compounds of the formulae (13), (14) and (15) in general are carried out analogously to known processes, as a rule in aqueous solution at temperatures of, for example, 0 to 30° C. and a pH of, for example, 3 to 7. Instead of the compound of the formula (15), it is also possible to employ the corresponding intermediate of the formula (17a), (17b) or (18)

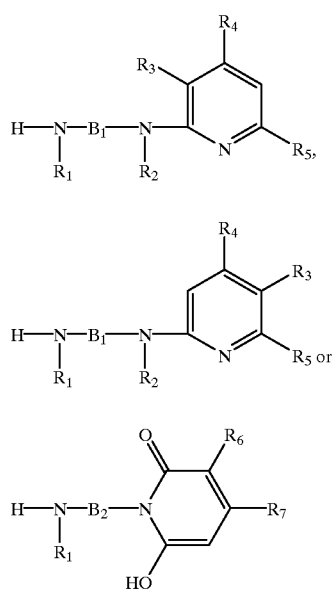

in the process and to produce the radical A only in the subsequent course of the process, by diazotization of an amine of the formula (16a) or (16b)

or

and subsequent coupling reactions. The radicals $B_1$, $B_2$, $D_1$, $D_2$, $R_2$, $R_3$, $R_4$, $R_5$, $R_6$ and $R_7$ are as defined above.

The compound of the formula (15) in which A is a radical of the formula (2a), (2b) or (3) is obtained by diazotizing an amine of the formula (16a) and coupling the diazotization product to a compound of the formula (17a) or (17b), or by diazotizing an amine of the formula (16b) and coupling the diazotization product to a compound of the formula (18).

The diazotization of the compound of the formula (16a) or (16b) and its coupling to the compound of the formula (17a), (17b) or (18), or to the condensation product obtained according to the procedure described above from the compound of the formula (17a), (17b) or (18) are carried out in the customary manner, for example by diazotizing the compound of the formula (16a) or (16b) in mineral acid solution, for example hydrochloric acid solution, with a nitrite, for example sodium nitrite, at a low temperature, for example at 0 to 5° C., and then coupling the diazotization product with the corresponding coupling component at a neutral to slightly acid pH, for example at pH 3 to 7, and low temperatures, for example 0 to 30° C.

The compounds of the formulae (13), (16a), (16b), (17a), (17b) and (18) are known or can be prepared analogously to known compounds.

The compounds of the formulae (17a) and (17b) as a rule are obtained as a mixture in the preparation.

The triazinyl compounds obtainable by the process described above still contain a halogen atom which can be converted into a group $X_1$ by reaction with a compound of the formulae $X_1$-H at elevated temperature, preferably 20 to 70° C., and a neutral to slightly alkaline pH, which is, for example, 7 to 9, depending on the compound of the formula $X_1$-H employed, where $X_1$ is as defined above, except for halogen. An excess of the compound of the formula $X_1$-H is advantageously employed.

If appropriate, the end product can also be subjected to a conversion reaction. Such a conversion reaction is, for example, the conversion of a vinylatable reactive group contained in $D_1$ or $D_2$ into its vinyl form by treatment with dilute sodium hydroxide solution, for example conversion of the β-sulfatoethylsulfonyl- or β-chloroethylsulfonyl group into the vinylsulfonyl radical. Such reactions are known per se.

The compounds of the formula (1) according to the invention are suitable as dyes for dyeing and printing widely varying materials, such as fibre materials containing hydroxyl groups or containing nitrogen. Examples of fibre materials containing nitrogen are silk, leather, wool, polyamide fibres and polyurethanes. The dyes according to the invention are particularly suitable for dyeing and printing all types of cellulosic fibre materials. Such cellulosic fibre materials are, for example, the natural cellulose fibres, such as cotton, linen and hemp, and pulp and regenerated cellulose, preferably cotton. The dyes according to the invention are also suitable for dyeing or printing cellulosic blend fabrics, for example mixtures of cotton and polyamide fibres, or in particular cotton/polyester blends.

The dyes according to the invention can be applied to the fibre material and fixed on the fibre in various ways, in particular in the form of aqueous dye solutions and printing pastes. They are suitable both for the exhaust method and for dyeing by the padder dyeing method, in which the goods are impregnated with aqueous dye solutions, which may contain salts, and the dyes are fixed, after an alkali treatment or in the presence of alkali, if appropriate with the action of heat or by storage at room temperature for several hours. After the fixing, the dyeings or prints are rinsed thoroughly with cold and hot water, if appropriate with the addition of an agent which has a dispersing action and promotes diffusion of the non-fixed portions.

The dyes according to the invention are distinguished by a high reactivity, good fixing capacity and very good build-up capacity. They can therefore be employed by the exhaust dyeing method at low dyeing temperatures and require only short steaming times in the pad-steam process. The degrees of fixing are high and the non-fixed portions can easily be washed out, the difference between the degree of exhaustion and degree of fixing being remarkably small, i.e. the soaping loss being very low. The dyes according to the invention are also particularly suitable for printing, in particular on cotton, and also for printing fibres containing nitrogen, for example wool or silk or blend fabrics which comprise wool or silk.

The dyeings and prints produced with the dyes according to the invention have a high colour strength and a high fibre-dye bond stability both in the acid and in the alkaline range, and furthermore a good fastness to light and very good wetfastness properties, such as fastness to washing, water, seawater, cross-dyeing and perspiration, and a good fastness to pleating, fastness to ironing and fastness to rubbing.

The following examples serve to illustrate the invention. The temperatures are stated in degrees Celsius, parts are parts by weight and the percentage data relate to the percentages by weight, unless stated otherwise. Parts by weight may be the same ratio to parts by volume as the kilogram to the litre.

EXAMPLE 1

36.3 parts of an amine of the formula $D_{10}$—$NH_2$, in which $D_{10}$ is a radical of the formula

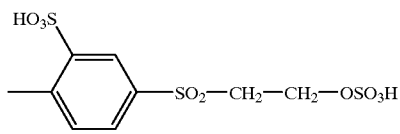

are dissolved under neutral conditions in 350 parts of water, with the addition of a sodium carbonate solution, and 7 parts of sodium nitrite are added. This solution is added dropwise to a mixture of 300 parts of ice/water and 30 parts of concentrated hydrochloric acid. The reaction mixture is stirred at 0° C. for one hour.

EXAMPLE 2

25 parts of a N sodium nitrite solution are added to a neutral solution of 41.2 parts of an amine of the formula $D_{11}$—$NH_2$, in which $D_{11}$ is a radical of the formula

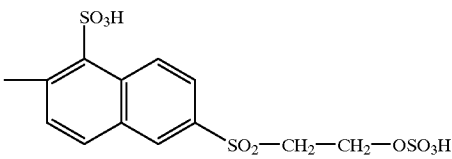

in 400 parts of water. This solution is added dropwise to a mixture of 300 parts of ice/water and 30 parts of concentrated hydrochloric acid. The reaction mixture is stirred at 0° C. for one hour.

EXAMPLES 3 TO 27

Diazo compounds of the amines defined in Table 1 can be prepared analogously to the procedure described in Examples 1 or 2 when an equimolar amount of the amines of the formula $D_{xy}$—$NH_2$ defined in Table 1 is used in place of the amines of the formula $D_{10}$—$NH_2$ or $D_{11}$—$NH_2$ defined in Examples 1 or 2.

TABLE 1

| Example | Amine $D_{xy}$-$NH_2$ | $D_{xy}$ |
|---|---|---|
| 3 | $D_{12}$-$NH_2$ | $D_{12}$ = ![structure with HO3S, CH3, SO2—CH2—CH2—OSO3H substituents on benzene] |
| 4 | $D_{13}$-$NH_2$ | $D_{13}$ = ![phenyl—SO2—CH2—CH2—OSO3H] |
| 5 | $D_{14}$-$NH_2$ | $D_{14}$ = ![HO3S-substituted phenyl—HN—C(=O)—CH(Br)—CH2Br] |
| 6 | $D_{15}$-$NH_2$ | $D_{15}$ = ![phenyl—CONH—(CH2)2—SO2—(CH2)2—Cl] |
| 7 | $D_{16}$-$NH_2$ | $D_{16}$ = ![HO3S-substituted phenyl—CONH—(CH2)2—SO2—(CH2)2—Cl] |

TABLE 1-continued

| Example | Amine $D_{xy}$-NH$_2$ | |
|---|---|---|
| 8 | $D_{17}$-NH$_2$ | $D_{17}$ = —C$_6$H$_4$—CONH—(CH$_2$)$_2$—SO$_2$—(CH$_2$)$_2$—OSO$_3$H |
| 9 | $D_{18}$-NH$_2$ | $D_{18}$ = 2-HO$_3$S-C$_6$H$_3$—CONH—(CH$_2$)$_2$—SO$_2$—(CH$_2$)$_2$—OSO$_3$H |
| 10 | $D_{19}$-NH$_2$ | $D_{19}$ = m-C$_6$H$_4$—CONH—(CH$_2$)$_2$—SO$_2$—(CH$_2$)$_2$—OSO$_3$H |
| 11 | $D_{20}$-NH$_2$ | $D_{20}$ = 4-OCH$_3$-C$_6$H$_3$—SO$_2$—CH$_2$—CH$_2$—OSO$_3$H |
| 12 | $D_{21}$-NH$_2$ | $D_{21}$ = 4-OCH$_3$-2-CH$_3$-C$_6$H$_2$—SO$_2$—CH$_2$—CH$_2$—OSO$_3$H |
| 13 | $D_{22}$-NH$_2$ | $D_{22}$ = 2,5-(OCH$_3$)$_2$-C$_6$H$_2$—SO$_2$—CH$_2$—CH$_2$—OSO$_3$H |
| 14 | $D_{23}$-NH$_2$ | $D_{23}$ = 5-SO$_3$H-naphthyl—SO$_2$—CH$_2$—CH$_2$—OSO$_3$H |
| 15 | $D_{24}$-NH$_2$ | $D_{24}$ = naphthyl—SO$_2$—CH$_2$—CH$_2$—OSO$_3$H |
| 16 | $D_{25}$-NH$_2$ | $D_{25}$ = 3-SO$_3$H-naphthyl—SO$_2$—CH$_2$—CH$_2$—OSO$_3$H |

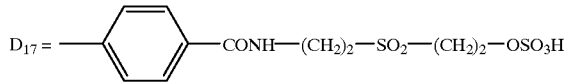
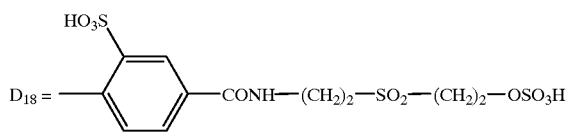
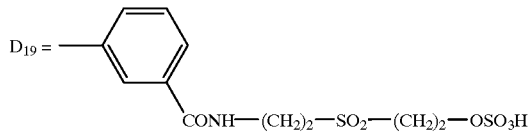
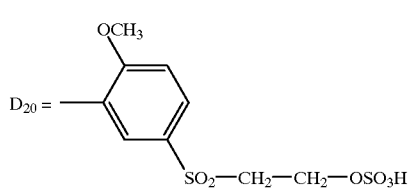
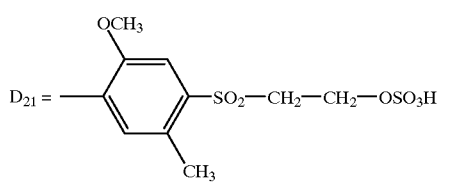
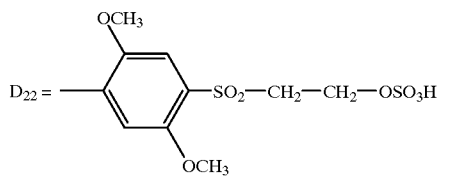
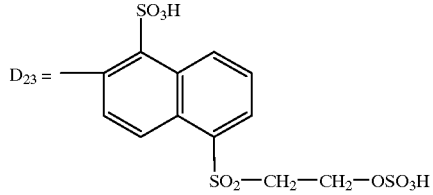
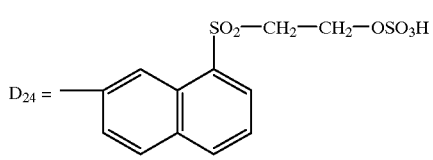
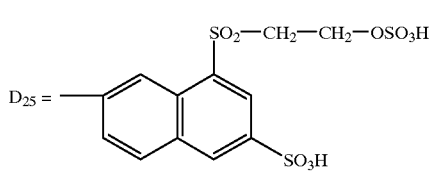

TABLE 1-continued

| Example | Amine $D_{xy}$-$NH_2$ | Structure |
|---|---|---|
| 17 | $D_{26}$-$NH_2$ | $D_{26}$ = 6-substituted naphthalene-2-yl-$SO_2$—$CH_2$—$CH_2$—$OSO_3H$ |
| 18 | $D_{27}$-$NH_2$ | $D_{27}$ = 5-methyl-naphthalen-2-yl (at 6-position)-$SO_2$—$CH_2$—$CH_2$—$OSO_3H$ |
| 19 | $D_{28}$-$NH_2$ | $D_{28}$ = benzene substituted with $HO_3S$, $SO_3H$, and $NH$—$CO$—$C(Br)$=$CH_2$ |
| 20 | $D_{29}$-$NH_2$ | $D_{29}$ = benzene with $HO_3S$ and $NHCO$—$(CH_2)_3$—$SO_2$—$(CH_2)_2$—$Cl$ |
| 21 | $D_{30}$-$NH_2$ | $D_{30}$ = benzene with $HO_3S$ and $NHCO$—$(CH_2)_3$—$SO_2$—$(CH_2)_2$—$Cl$ |
| 22 | $D_{31a}$-$NH_2$–$D_{31r}$-$NH_2$ | $D_{31a}$–$D_{31r}$ = benzene with $HO_3S$, $SO_3H$, and $NH$-(triazine with $T_1$ and $Cl$ substituents) |

$T_1$:

| | | |
|---|---|---|
| 22a | $D_{31a}$-$NH_2$ | $D_{31a}$ = —$NH$—$C_6H_4$—$SO_3H$ |
| 22b | $D_{31b}$-$NH_2$ | $D_{31b}$ = —$NH$—$C_6H_4$—$CH_3$ (meta) |
| 22c | $D_{31c}$-$NH_2$ | $D_{31c}$ = —$NH$—$C_6H_4$—$NHCO$—$CH_3$ (meta) |

TABLE 1-continued

| Example | Amine $D_{xy}$-$NH_2$ | |
|---|---|---|
| 22d | $D_{31d}$-$NH_2$ | $D_{31d}$ —NH—C$_6$H$_4$(2-Cl) (2-chlorophenylamino) |
| 22e | $D_{31e}$-$NH_2$ | $D_{31e}$ —NHCH$_2$CH$_2$OH |
| 22f | $D_{31f}$-$NH_2$ | $D_{31f}$ —N(CH$_2$CH$_2$OH)$_2$ |
| 22g | $D_{31g}$-$NH_2$ | $D_{31g}$ —N(CH$_2$CH$_2$OH)(CH$_2$CH$_3$) |
| 22h | $D_{31h}$-$NH_2$ | $D_{31h}$ —N(CH$_2$CH$_2$OH)(CH$_3$) |
| 22i | $D_{31i}$-$NH_2$ | $D_{31i}$ —NH—(CH$_2$)$_2$—O—(CH$_2$)$_2$—OH |
| 22j | $D_{31j}$-$NH_2$ | $D_{31j}$ —NHCH$_2$CH$_2$SO$_3$H |
| 22k | $D_{31k}$-$NH_2$ | $D_{31k}$ —N(CH$_2$CH$_2$SO$_3$H)(CH$_3$) |
| 22l | $D_{31l}$-$NH_2$ | $D_{31l}$ —morpholino |
| 22m | $D_{31m}$-$NH_2$ | $D_{31m}$ —NH—(CH$_2$)$_2$—SO$_2$—(CH$_2$)$_2$—Cl |
| 22n | $D_{31n}$-$NH_2$ | $D_{31n}$ —NH—(CH$_2$)$_2$—O—(CH$_2$)$_2$—SO$_2$—(CH$_2$)$_2$—Cl |
| 22o | $D_{31o}$-$NH_2$ | $D_{31o}$ —NH—C$_6$H$_4$—SO$_2$—CH$_2$CH$_2$—OSO$_3$H (para) |
| 22p | $D_{31p}$-$NH_2$ | $D_{31p}$ —NH—C$_6$H$_4$—SO$_2$—CH$_2$CH$_2$—OSO$_3$H (meta) |
| 22q | $D_{31q}$-$NH_2$ | $D_{31q}$ —NH—C$_6$H$_4$—CONH(CH$_2$)$_2$SO$_2$(CH$_2$)$_2$—OSO$_3$H (meta) |
| 22r | $D_{31r}$-$NH_2$ | $D_{31r}$ —NH—C$_6$H$_3$(SO$_3$H)(NHCO—CHBr—CH$_2$Br) |

TABLE 1-continued
| Example | Amine $D_{xy}-NH_2$ | |
|---|---|---|
| 23 | $D_{32}-NH_2$ | $D_{32}=$ 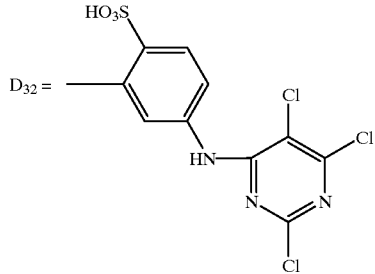 |
| 24 | $D_{33}-NH_2$ | $D_{33}=$ 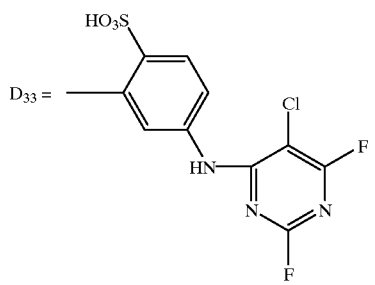 |
| 25 | $D_{34}-NH_2$ | $D_{34}=$ 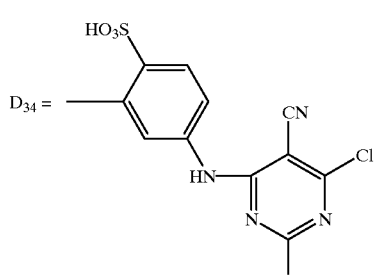 |
| 26 | $D_{35}-NH_2$ | $D_{35}=$ 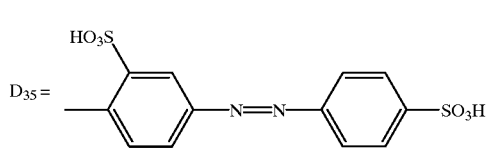 |
| 27 | $D_{36}-NH_2$ | $D_{36}=$ 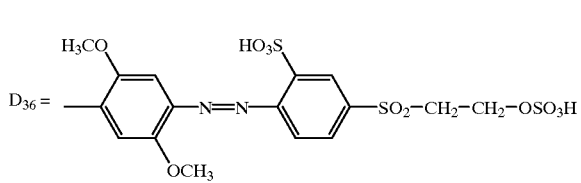 |

EXAMPLE 28a

The acid diazo compound suspension obtained according to Example 1 is added dropwise to a solution of 21.3 parts of pyridone coupling component of the formula

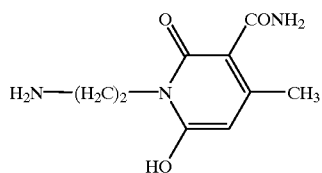

in 600 parts of water. The temperature is kept at 5° C. and the pH is kept at 3 to 5 by addition of a sodium hydroxide solution. The suspension of a yellow dye which, in the form of the free acid, has the formula

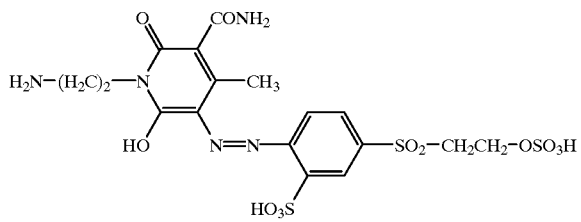

is obtained.

EXAMPLE 28b

Analogously to the procedure described in Example 28a, from the pyridone coupling compound of the formula

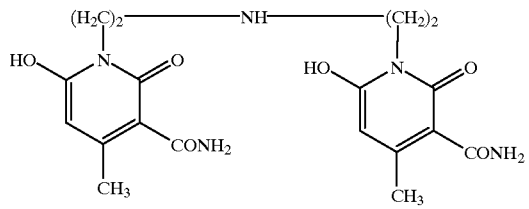

the suspension of a yellow dye which, in the form of the free acid, has the formula

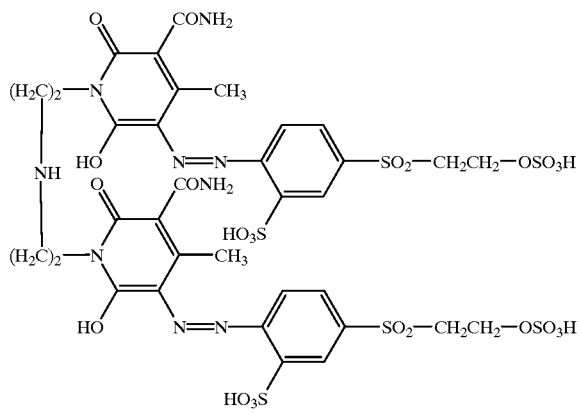

is obtained.

EXAMPLE 29

The acid diazo compound suspension obtained according to Example 2 is added dropwise to a cold solution of 21 parts of the pyridone coupling component from Example 28a in 300 parts of water, the pH being kept at 7 by addition of a sodium hydroxide solution. The reaction mixture is stirred for one hour, during which it is allowed to warm to 20° C. The suspension of a yellow dye which, in the form of the free acid, has the formula

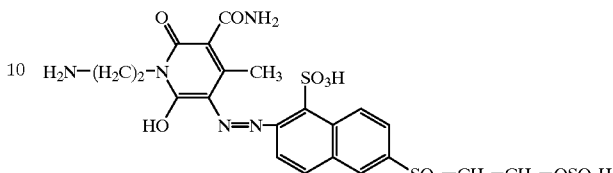

is obtained.

EXAMPLE 30

56.4 parts of 3-cyano-2,6-dichloro-4-methylpyridine are added in portions to 130 parts of ethanolamine at 25° C. in the course of one hour and the mixture is stirred for one hour. The reaction mixture is discharged onto 900 parts of water and stirred. The product which has precipitated out is filtered off and dried in vacuo. 60 parts of a mixture of the compounds of the formulae

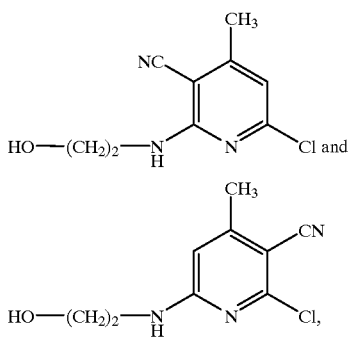

are obtained and are introduced into 250 parts of 1,3-propylenediamine at 100° C. After one hour, the excess 1,3-propylenediamine is distilled off under reduced pressure. 55 parts of a mixture of the compounds of the formulae

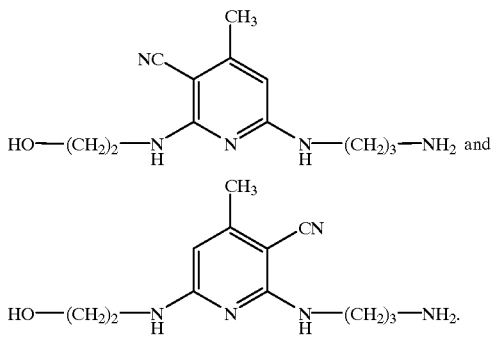

are obtained from the resulting oil by reprecipitation in isopropanol with hydrochloric acid.

EXAMPLE 31

14 parts of trifluorotriazine are added dropwise to a neutral solution of 60 parts of the copper complex of 5-amino-3-[3-phenyl-5-(2-carboxy-5-sulfophenyl)-1-formazano]-4-hydroxybenzenesulfonic acid and 5 parts of disodium hydrogen phosphate in 500 parts of water at a temperature below 2° C., the pH being kept constant by addition of a sodium hydroxide solution. The solution of a compound which, in the form of the free acid, has the formula

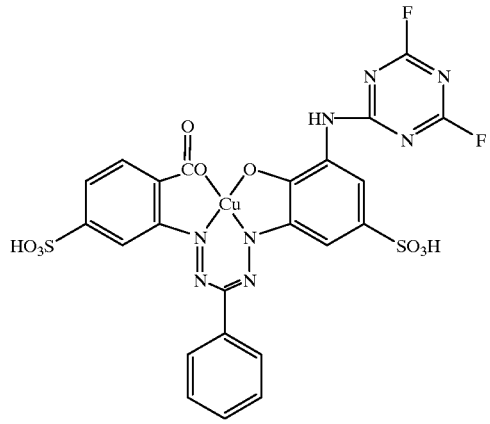

is obtained.

EXAMPLE 32

19 parts of cyanuric chloride are stirred vigorously into 50 parts of water at a temperature of 0° C., with the addition of a wetting agent and 5 parts of disodium hydrogen phosphate. A neutral solution of 60 parts of the copper complex of 5-amino-3-[3-phenyl-5-(2-carboxy-5-sulfophenyl)-1-formazano]-4-hydroxybenzenesulfonic acid in 500 parts of water is added dropwise. The temperature is kept at 2 to 5° C. and the pH is kept at 5 by addition of sodium hydroxide solution. The solution of a compound which, in the form of the free acid, has the formula

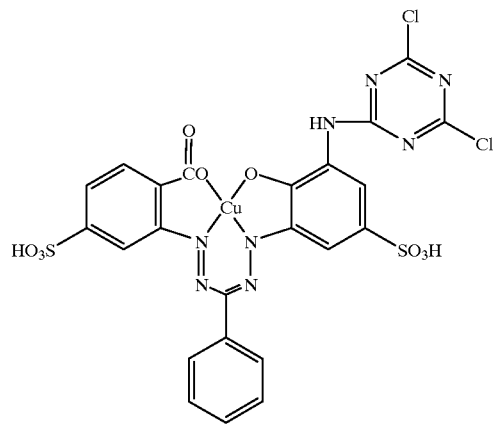

is obtained.

EXAMPLE 33a

The solution obtained according to Example 31 is added to the yellow dye suspension obtained according to Example 28a, the pH being kept at 7 to 8 by addition of a sodium hydroxide solution. The temperature is 20 to 30° C. The resulting solution is then freed from the salt by dialysis and freeze dried. 110 parts of a compound which, in the form of the free acid, has the formula (101)

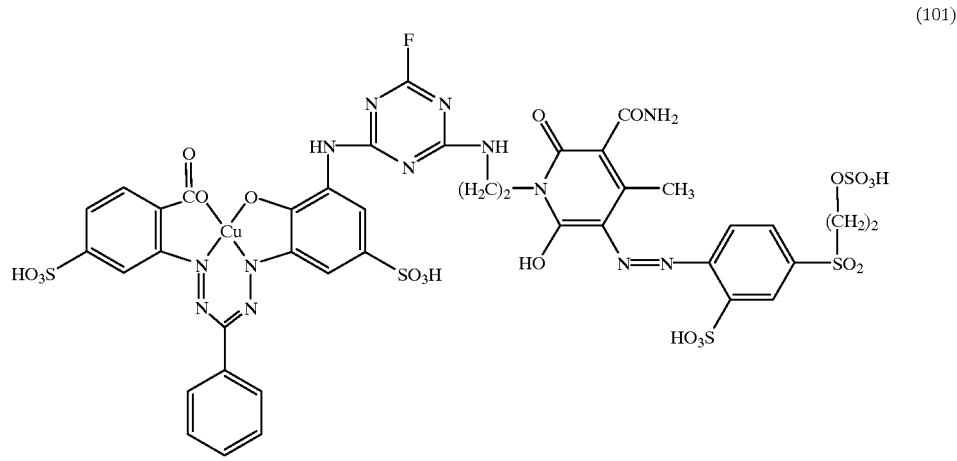

(101)

and dyes cotton in green colour shades with good all-round properties are obtained.

EXAMPLE 33b

A dye which, in the form of the free acid, has the formula (102)

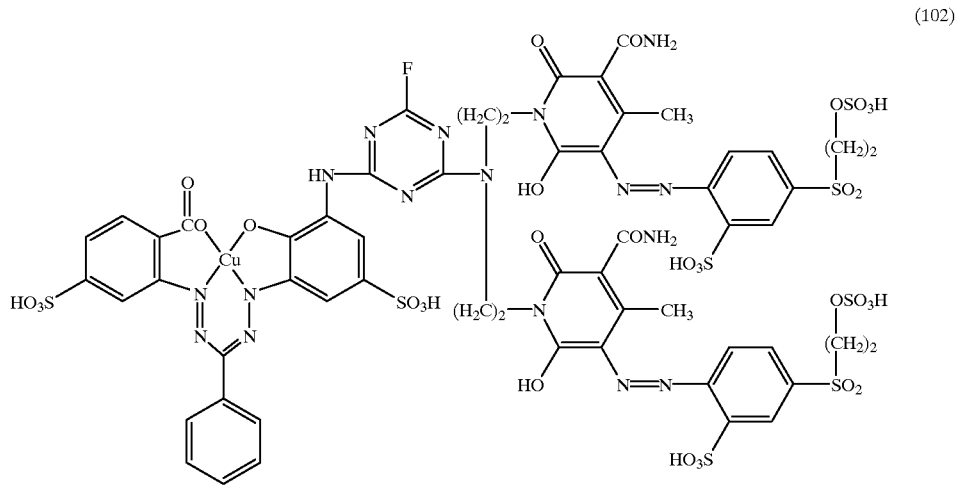

and dyes cotton in green colour shades with good all-round properties is obtained analogously to the procedure described in Example 33a from the suspension obtained according to Example 28b.

EXAMPLE 34

The solution obtained according to Example 32 is added to the yellow dye suspension obtained according to Example 29, the pH being kept at 7.5 to 8 by addition of a sodium hydroxide solution and the temperature being kept at 30 to 40° C. 240 parts of sodium chloride are added to the resulting dye solution. After one hour, the dye which has precipitated out is filtered off and dried in vacuo at 60° C. 160.8 parts of a compound which, in the form of the free acid, has the formula (103)

and dyes cotton in green colour shades with good all-round properties are obtained.

EXAMPLE 35

The acid diazo compound suspension obtained according to Example 1 is coupled to 29.4 parts of the mixture of pyridine compounds from Example 30 analogously to the procedure described in Example 28a, and the resulting suspension of the azo dyes is further reacted directly, analogously to the procedure described in Example 33, with a solution of the formazan compound obtained according to Example 31. 167 parts of a dye powder which essentially comprises compounds which, in the form of the free acid, have the formulae (104) and (105)

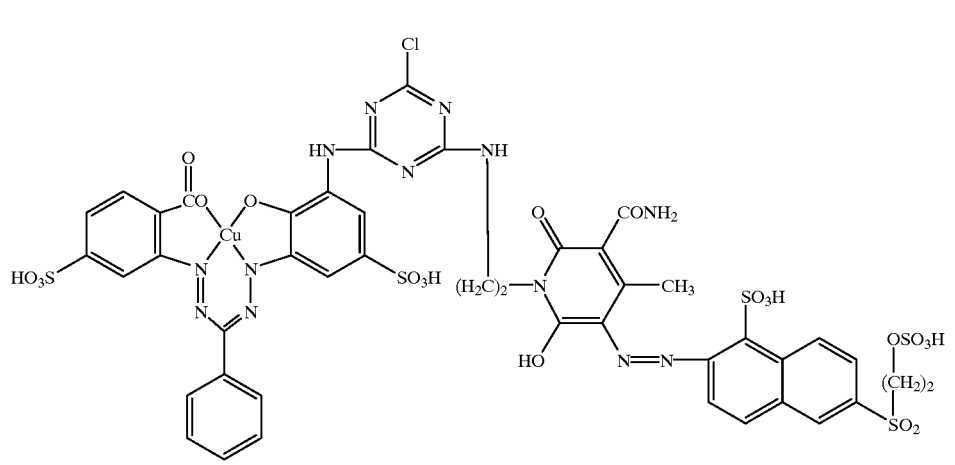

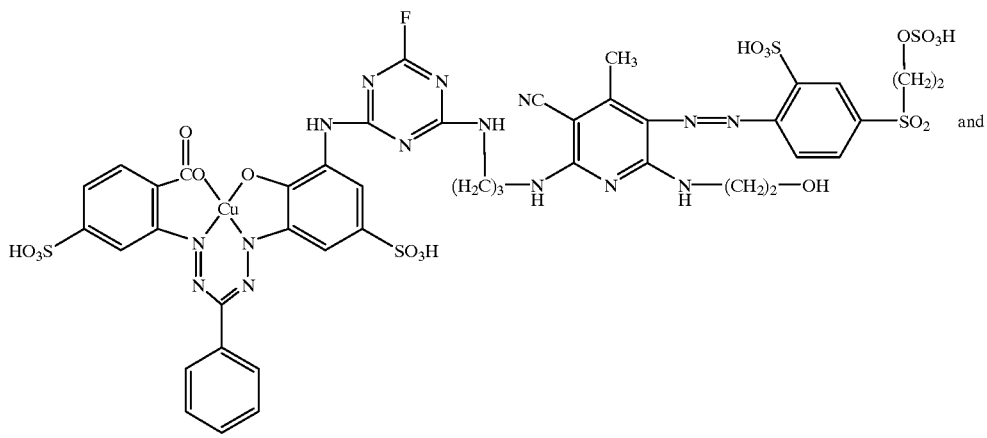

(104)

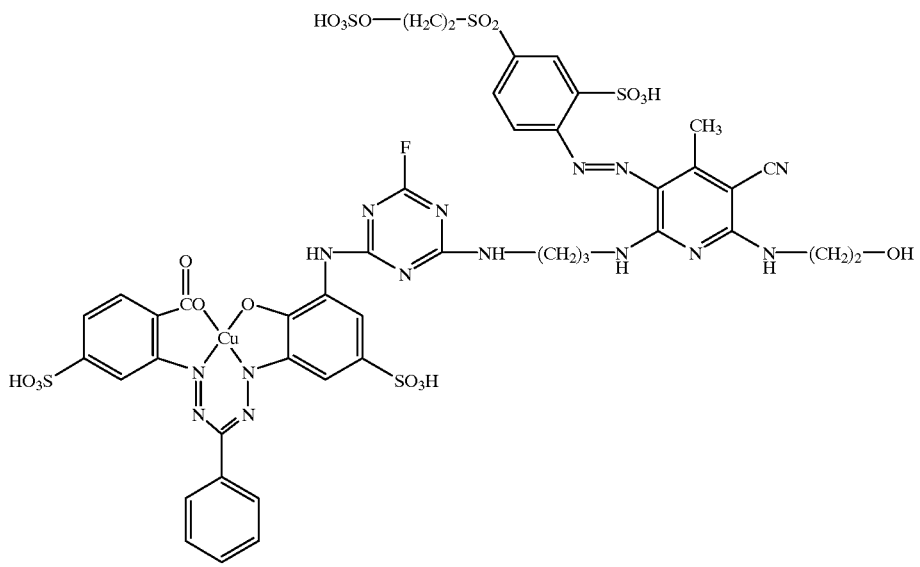

(105)

and dyes cotton in green colour shades with good all-round properties are obtained.

EXAMPLES 36 to 123

The dyes of the following general formula (106)

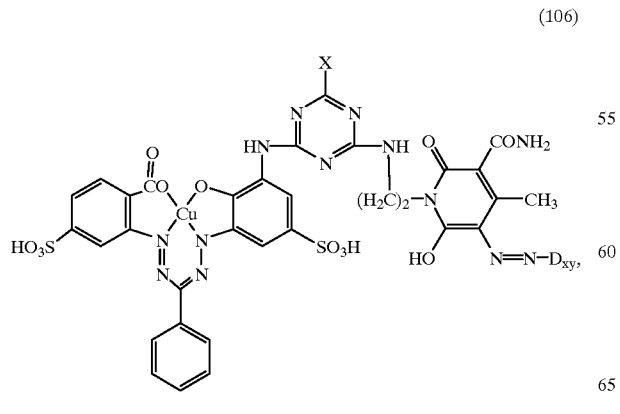

(106)

which $D_{xy}$ and X in each case are the radicals listed in Table 2 and the radical $D_{xy}$ in each case is as defined in Examples 1 to 27 are obtained from the diazo compounds described in Examples 1 to 27 analogously to the procedure described in Examples 28a, 29, 33a and 34. The dyes dye cotton and wool in green colour shades with good all-round properties.

TABLE 2

| Example | $D_{xy}$ | X |
|---------|----------|---|
| 36 | $D_{10}$ | Cl |
| 37 | $D_{11}$ | F |
| 38 | $D_{12}$ | F |
| 39 | $D_{13}$ | F |
| 40 | $D_{14}$ | F |
| 41 | $D_{15}$ | F |
| 42 | $D_{16}$ | F |
| 43 | $D_{17}$ | F |
| 44 | $D_{18}$ | F |
| 45 | $D_{19}$ | F |
| 46 | $D_{20}$ | F |
| 47 | $D_{21}$ | F |
| 48 | $D_{22}$ | F |
| 49 | $D_{23}$ | F |
| 50 | $D_{24}$ | F |

TABLE 2-continued

| Example | $D_{xy}$ | X |
|---|---|---|
| 51 | $D_{25}$ | F |
| 52 | $D_{26}$ | F |
| 53 | $D_{27}$ | F |
| 54 | $D_{28}$ | F |
| 55 | $D_{29}$ | F |
| 56 | $D_{30}$ | F |
| 57 | $D_{31a}$ | F |
| 58 | $D_{31b}$ | F |
| 59 | $D_{31c}$ | F |
| 60 | $D_{31d}$ | F |
| 61 | $D_{31e}$ | F |
| 62 | $D_{31f}$ | F |
| 63 | $D_{31g}$ | F |
| 64 | $D_{31h}$ | F |
| 65 | $D_{31i}$ | F |
| 67 | $D_{31j}$ | F |
| 68 | $D_{31k}$ | F |
| 69 | $D_{31l}$ | F |
| 70 | $D_{31m}$ | F |
| 71 | $D_{31n}$ | F |
| 72 | $D_{31o}$ | F |
| 73 | $D_{31p}$ | F |
| 74 | $D_{31q}$ | F |
| 75 | $D_{31r}$ | F |
| 76 | $D_{32}$ | F |
| 77 | $D_{33}$ | F |
| 78 | $D_{34}$ | F |
| 79 | $D_{35}$ | F |
| 80 | $D_{36}$ | F |
| 81 | $D_{12}$ | Cl |
| 82 | $D_{13}$ | Cl |
| 83 | $D_{14}$ | Cl |
| 84 | $D_{15}$ | Cl |
| 85 | $D_{16}$ | Cl |
| 86 | $D_{17}$ | Cl |
| 87 | $D_{18}$ | Cl |
| 88 | $D_{19}$ | Cl |
| 89 | $D_{20}$ | Cl |
| 90 | $D_{21}$ | Cl |
| 91 | $D_{22}$ | Cl |
| 92 | $D_{23}$ | Cl |
| 93 | $D_{24}$ | Cl |
| 94 | $D_{25}$ | Cl |
| 95 | $D_{26}$ | Cl |
| 96 | $D_{27}$ | Cl |
| 97 | $D_{28}$ | Cl |
| 98 | $D_{29}$ | Cl |
| 99 | $D_{30}$ | Cl |
| 100 | $D_{31a}$ | Cl |
| 101 | $D_{31b}$ | Cl |
| 102 | $D_{31c}$ | Cl |
| 103 | $D_{31d}$ | Cl |
| 104 | $D_{31e}$ | Cl |
| 105 | $D_{31f}$ | Cl |
| 106 | $D_{31g}$ | Cl |
| 107 | $D_{31h}$ | Cl |
| 108 | $D_{31i}$ | Cl |
| 109 | $D_{31j}$ | Cl |
| 110 | $D_{31k}$ | Cl |
| 111 | $D_{31l}$ | Cl |
| 112 | $D_{31m}$ | Cl |
| 113 | $D_{31n}$ | Cl |
| 114 | $D_{31o}$ | Cl |
| 116 | $D_{31p}$ | Cl |
| 117 | $D_{31q}$ | Cl |
| 118 | $D_{31r}$ | Cl |
| 119 | $D_{32}$ | Cl |
| 120 | $D_{33}$ | Cl |
| 121 | $D_{34}$ | Cl |
| 122 | $D_{35}$ | Cl |
| 123 | $D_{36}$ | Cl |

EXAMPLES 124 TO 155

A dye composition which essentially comprises compounds which, in the form of the free acid, have the formulae (107) and (108)

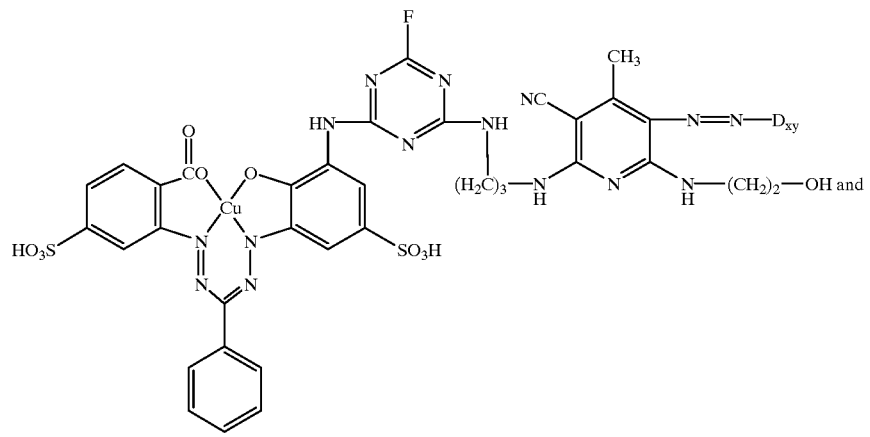

(107)

-continued

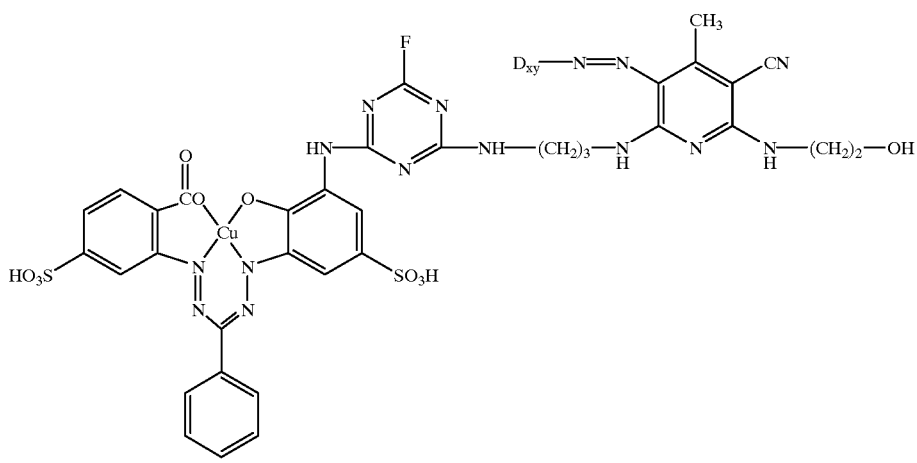
(108)

in which $D_{xy}$ in each case is the radicals listed in Table 3 and these radicals are in each case as defined in Examples 2 to 27, are obtained from the diazo compounds described in Examples 2 to 27 analogously to the procedure described in Example 35. The dyes dye cotton in green colour shades with good all-round properties.

TABLE 3

| Example | $D_{xy}$ |
|---|---|
| 124 | $D_{11}$ |
| 125 | $D_{12}$ |
| 126 | $D_{14}$ |
| 127 | $D_{16}$ |
| 128 | $D_{18}$ |
| 129 | $D_{23}$ |
| 130 | $D_{25}$ |
| 131 | $D_{28}$ |
| 132 | $D_{29}$ |
| 133 | $D_{30}$ |
| 134 | $D_{31a}$ |
| 135 | $D_{31b}$ |
| 136 | $D_{31c}$ |
| 137 | $D_{31d}$ |
| 138 | $D_{31e}$ |
| 139 | $D_{31f}$ |
| 140 | $D_{31g}$ |
| 141 | $D_{31h}$ |
| 142 | $D_{31i}$ |
| 143 | $D_{31j}$ |
| 144 | $D_{31k}$ |
| 145 | $D_{31l}$ |
| 146 | $D_{31m}$ |
| 147 | $D_{31n}$ |
| 148 | $D_{31o}$ |
| 149 | $D_{31p}$ |
| 150 | $D_{31q}$ |
| 151 | $D_{31r}$ |
| 152 | $D_{32}$ |
| 153 | $D_{33}$ |
| 154 | $D_{34}$ |
| 155 | $D_{35}$ |

EXAMPLES 156 TO 171

Dyes which, in the form of the free acid, have the general formula (109)

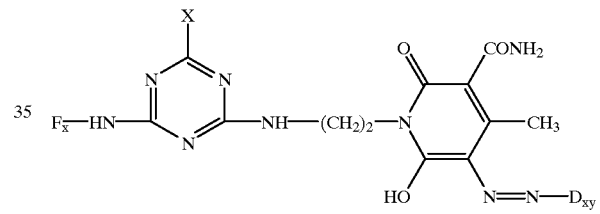
(109)

in which $D_{xy}$, $F_x$ and X are each the radicals defined in Table 4, where $D_{xy}$ in each case is as defined in Examples 1 and 2 and the radical $F_x$ in each case is one of the formazan radicals defined below, are obtained from the copper-formazan complexes of the formula $F_x$—$NH_2$ analogously to the procedure described in Examples 31, 32, 33a and 34. The dyes dye cotton in green colour shades with good all-round properties.

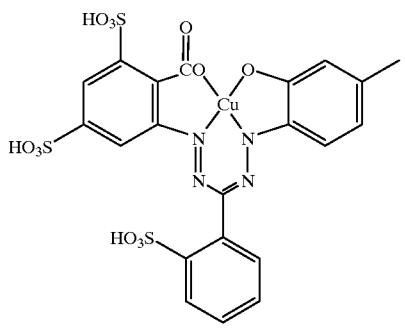
$F_1$

-continued

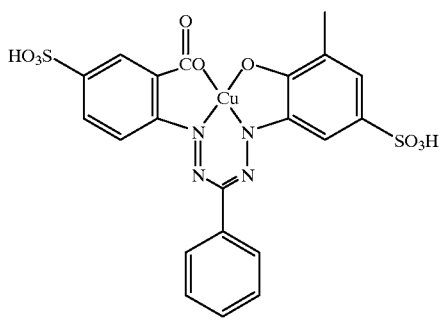

F2

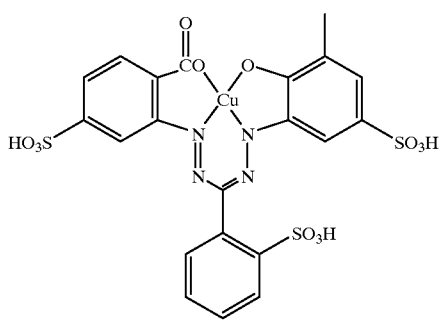

F3

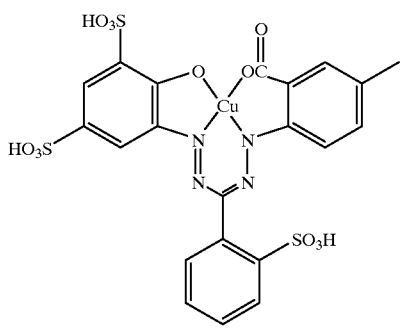

F4

TABLE 4

| Example | $D_{xy}$ | $F_x$ | X |
|---|---|---|---|
| 156 | $D_{10}$ | $F_1$ | F |
| 157 | $D_{10}$ | $F_2$ | F |
| 158 | $D_{10}$ | $F_3$ | F |
| 159 | $D_{10}$ | $F_4$ | F |
| 160 | $D_{10}$ | $F_1$ | Cl |
| 161 | $D_{10}$ | $F_2$ | Cl |
| 162 | $D_{10}$ | $F_3$ | Cl |
| 163 | $D_{10}$ | $F_4$ | Cl |
| 164 | $D_{11}$ | $F_1$ | F |
| 165 | $D_{11}$ | $F_2$ | F |
| 166 | $D_{11}$ | $F_3$ | F |
| 167 | $D_{11}$ | $F_4$ | F |
| 168 | $D_{11}$ | $F_1$ | Cl |
| 169 | $D_{11}$ | $F_2$ | Cl |
| 170 | $D_{11}$ | $F_3$ | Cl |
| 171 | $D_{11}$ | $F_4$ | Cl |

Dyeing Instructions 1

100 parts of cotton fabric are introduced at 60° C. into 1500 parts of a dye bath which comprises 45 g/l of sodium chloride and 2 parts of the reactive dye obtained according to Example 33a. After 45 minutes at 60° C., 20 g/l of calcined sodium carbonate are added. Dyeing is continued at this temperature for 45 minutes. Thereafter, the dyed goods are rinsed, soaped at the boil with a nonionic detergent for a quarter of an hour, rinsed again and dried.

As an alternative to the instructions described, dyeing can also be carried out at 80° C. instead of at 60° C.

Dye Instructions II 0.1 part of the dye according to Example 33a is dissolved in 200 parts of water, and 0.5 part of sodium sulfate, 0.1 part of a levelling auxiliary (based on the condensation product of a higher aliphatic amine and ethylene oxide) and 0.5 part of sodium acetate are added. The pH is then brought to a value of 5.5 with acetic acid (80%). The dyebath is heated at 50° C. for 10 minutes and 10 parts of a woolen fabric are then added. The dyebath is heated to a temperature of 100° C. in the course of about 50 minutes and dyeing is carried out at this temperature for 60 minutes. Thereafter, the dyebath is allowed to cool to 90° C. and the dyed goods are removed. The woollen fabric is washed with warm and cold water and then spun and dried.

Printing Instructions 3 parts of the dye obtained according to Example 33a are sprinkled with rapid stirring into 100 parts of a stock thickener comprising 50 parts of 5% sodium alginate thickener, 27.8 parts of water, 20 parts of urea, 1 part of sodium m-nitrobenzenesulfonate and 1.2 parts of sodium bicarbonate. A cotton fabric is printed with the printing paste thus obtained, and the resulting printed material is dried and steamed in saturated steam at 102° C. for 2 minutes. The printed fabric is then rinsed, soaped at the boil and rinsed again, if appropriate, and then dried.

What is claimed is:

1. A dye of the formula (1)

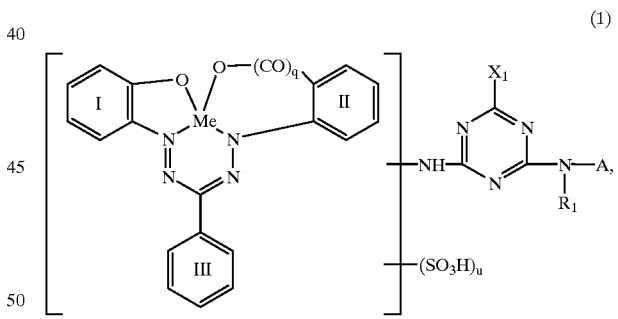

(1)

in which

Me is Cu or Ni, $R_1$, is hydrogen or substituted or unsubstituted $C_1$–$C_4$alkyl or $R_1$, is as defined for A, $X_1$ is halogen, hydroxyl, $C_1$–$C_4$alkoxy, substituted or unsubstituted $C_1$–$C_4$alkylthio or amino or is an N-heterocyclic radical which may contain further heteroatoms, u is the number 1, 2, 3 or 4, q is the number 0 or 1, the benzene rings I, II or III are unsubstituted or further substituted and A is a radical of the formula (2a), (2b) or (3)

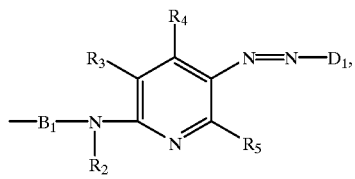
(2a)

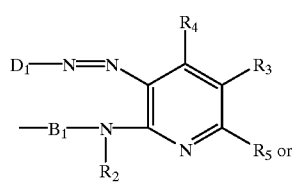
(2b)

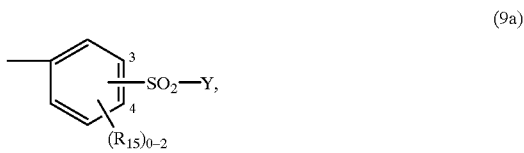
(3)

in which

B$_1$ and B$_2$ independently of one another are an aliphatic bridge member,

D$_1$ and D$_2$ independently of one another are the radical of a diazo component of the benzene or naphthalene series, R$_2$ is hydrogen or substituted or unsubstituted C$_1$–C$_4$alkyl, R$_3$ and R$_6$ independently of one another are hydrogen, cyano, carbamoyl or sulfomethyl, R$_4$ is hydrogen, C$_1$–C$_4$alkyl or amino, R$_5$ is amino or N-mono- or N,N- di- C$_1$–C$_4$alkylamino which are unsubstituted or substituted in the alkyl part and R$_7$ is hydrogen or C$_1$–C$_4$alkyl.

2. A dye according to claim 1, wherein
Me is Cu.

3. A dye according to claim 1, wherein
R$_1$ is hydrogen, C$_1$–C$_4$alkyl which is unsubstituted or substituted by hydroxyl or a radical A.

4. A dye according to claim 1, wherein
R$_1$ is hydrogen or a radical A.

5. A dye according to claim 1, wherein
X$_1$ is chlorine or fluorine.

6. A dye according to claim 1, wherein
q is the number 1.

7. A dye according to claim 1, wherein
B$_1$ and B$_2$ independently of one another are straight-chain or branched C$_2$–C$_6$alkylene.

8. A dye according to claim 1, wherein
the radicals D$_1$ and D$_2$ independently of one another are each a radical of the formula (9a), (9b), (9c), (9d), (9e) or (9f)

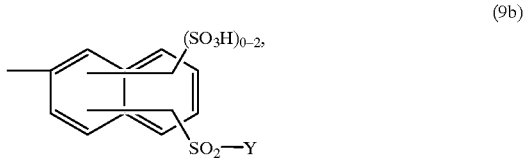
(9a)

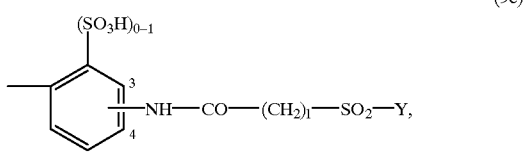
(9b)

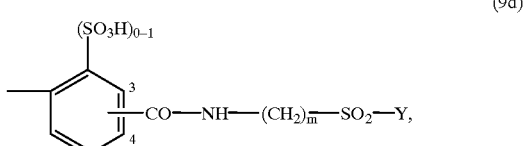
(9c)

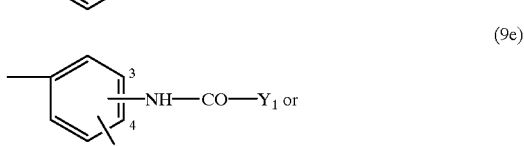
(9d)

(9e)

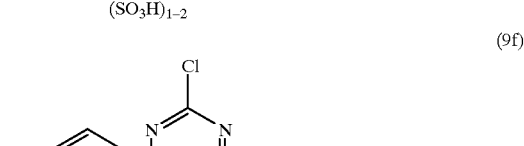
(9f)

in which (R$_{15}$)$_{0-2}$ and (R$_{16}$)$_{0-2}$ independently of one another are 0 to 2 identical or different s chosen from the group consisting of halogen, C$_1$–C$_4$alkyl, C$_1$–C$_4$alkoxy and sulfo, Y is vinyl, β-chloroethyl or β-sulfatoethyl, Y$_1$ is a group —CH(Br)—CH$_2$—Br or —C(Br)=CH$_2$ and l and m independently of one another are the number 2 or 3.

9. A dye according to claim 1, wherein the formazan radical in the dye of the formula (1) is a radical of the formula (11) or (12)

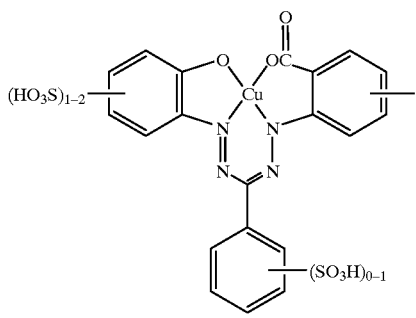

or

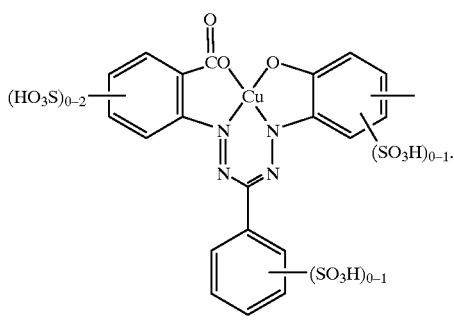

10. A dye according to claim 8, which has the formula (1a)

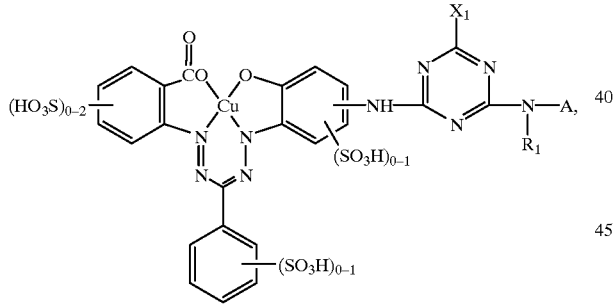

in which

X₁ is fluorine or chlorine,

R₁ is hydrogen or R₁ is as defined for A and

A is a radical of the formula (2a'), (2b') or (3a)

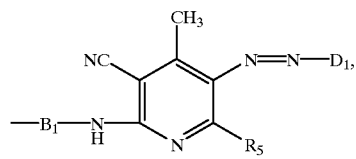
(2a')

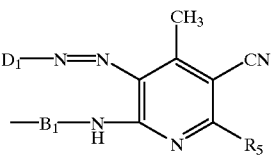
(2b')

or

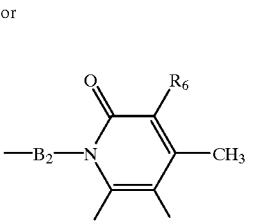
(3a)

in which

B₁ and B₂ are straight-chain or branched C₂–C₆alkylene,

D₁ and D₂ independently of one another are each a radical of the formula (9a), (9b), (9c), (9d), (9e) or (9f), R₅ is amino or N-β-hydroxyethylamino and R₆ is carbamoyl or sulfomethyl.

11. A process for the preparation of a dye according to claim 1, which comprises reacting in each case about 1 molar equivalent of a compound of the formula (13)

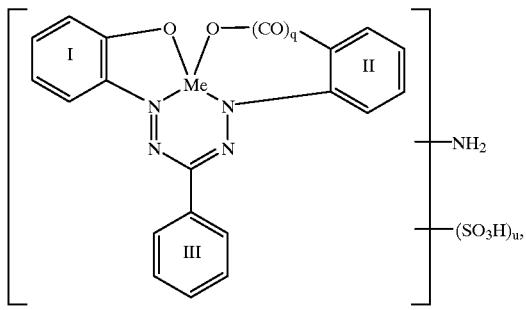
(13)

a compound of the formula (14)

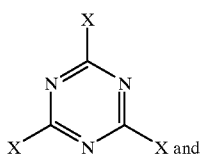
(14)

an amine of the formula (15)

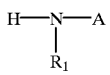
(15)

with one another in any sequence, where A, Me, R₁, u and q are as defined in claim 1 and X is halogen.

12. A process for dyeing or printing a fibre material containing hydroxyl groups or nitrogen, which comprises applying to said fibre material a dye of formula (1) according to claim 1.

13. A process according to claim 12, wherein said fibre material is cellulosic fibre material.

14. A process according to claim 12, wherein said fibre material is cotton.

* * * * *

UNITED STATES PATENT AND TRADEMARK OFFICE
CERTIFICATE OF CORRECTION

PATENT NO.    : 6,353,094 B1
DATED         : March 5, 2002
INVENTOR(S)   : Athanassios Tzikas et al.

It is certified that error appears in the above-identified patent and that said Letters Patent is hereby corrected as shown below:

<u>Title page,</u>
Item [30], should read -- [30] Foreign Application Priority Data
Mar. 22, 1999 (EPO) 99810250.3 --.

Signed and Sealed this

Tenth Day of September, 2002

Attest:

Attesting Officer

JAMES E. ROGAN
*Director of the United States Patent and Trademark Office*